US010516326B2

(12) United States Patent
Han

(10) Patent No.: US 10,516,326 B2
(45) Date of Patent: Dec. 24, 2019

(54) VOICE COIL MOTOR

(71) Applicant: LG Innotek Co., Ltd., Seoul (KR)

(72) Inventor: Jin Suk Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 642 days.

(21) Appl. No.: 15/065,190

(22) Filed: Mar. 9, 2016

(65) Prior Publication Data

US 2016/0190905 A1    Jun. 30, 2016

Related U.S. Application Data

(63) Continuation of application No. 13/676,628, filed on Nov. 14, 2012, now Pat. No. 9,300,196.

(30) Foreign Application Priority Data

Nov. 16, 2011  (KR) .................. 10-2011-0119351
Dec. 23, 2011  (KR) .................. 10-2011-0141199
Dec. 23, 2011  (KR) .................. 10-2011-0141200
Dec. 23, 2011  (KR) .................. 10-2011-0141201

(51) Int. Cl.
*H02K 41/035* (2006.01)
*G02B 7/10* (2006.01)
(Continued)

(52) U.S. Cl.
CPC .......... *H02K 41/0354* (2013.01); *G02B 7/08* (2013.01); *G02B 7/102* (2013.01); *G02B 27/646* (2013.01);
(Continued)

(58) Field of Classification Search
CPC .......... G02B 7/105; G02B 7/08; G02B 7/102; G02B 27/646; H02K 33/00; H02K 33/02;
(Continued)

(56) References Cited

U.S. PATENT DOCUMENTS 5,541,777 A     7/1996 Sakamoto et al.
5,999,342 A *  12/1999 Okada .................. G11B 7/093
                                                    359/813
(Continued)

FOREIGN PATENT DOCUMENTS

CN   102016708 A   4/2011
JP   2007041326 A  2/2007
(Continued)

OTHER PUBLICATIONS

Office Action dated Apr. 6, 2016 in Chinese Application No. 201210465936.2.
(Continued)

*Primary Examiner* — Michael Andrews
*Assistant Examiner* — Robert E Mates
(74) *Attorney, Agent, or Firm* — Saliwanchik, Lloyd & Eisenschenk

(57) ABSTRACT

A VCM is disclosed, the VCM including a rotor including a bobbin arranged at an upper surface of a base formed with an opening, and a driving coil wound on the bobbin, a stator including a driving magnet opposite to the driving coil, and a yoke secured by the driving magnet at an inner surface of a lateral plate, and a tilting unit including a tilt magnet arranged at an outer surface of the lateral plate, a housing fixing the tilt magnet, and a tilt coil unit opposite to the tilt magnet.

23 Claims, 12 Drawing Sheets

(51) Int. Cl.
    *G02B 7/08*     (2006.01)
    *G02B 27/64*     (2006.01)
    *H02K 33/02*     (2006.01)
    *H02K 33/16*     (2006.01)
    *H02K 35/04*     (2006.01)
    *H02K 16/00*     (2006.01)
    *G02B 7/105*     (2006.01)
    *H02K 35/00*     (2006.01)
    *H02K 33/00*     (2006.01)

(52) U.S. Cl.
    CPC .......... *H02K 41/035* (2013.01); *G02B 7/105* (2013.01); *H02K 16/00* (2013.01); *H02K 33/00* (2013.01); *H02K 33/02* (2013.01); *H02K 33/16* (2013.01); *H02K 35/00* (2013.01); *H02K 35/04* (2013.01); *H02K 2201/18* (2013.01)

(58) Field of Classification Search
    CPC ........ H02K 33/16; H02K 35/00; H02K 35/04; H02K 41/035; H02K 41/0354; H02K 16/00; H02K 2201/18
    USPC ..... 310/68 A, 68 B, 68 C, 68 D, 68 E, 68 R, 310/13, 14, 12.15, 12.16, 12.17, 12.21, 310/12.22, 12.27, 12.31, 15, 20, 23, 25, 310/37; 359/696, 823, 824; 174/520, 174/525, 535, 542
    See application file for complete search history.

(56) References Cited

U.S. PATENT DOCUMENTS

| | | | |
|---|---|---|---|
| 6,086,209 | A | 7/2000 | Miyahara et al. |
| 6,388,789 | B1 * | 5/2002 | Bernstein ............. B81B 3/0021 359/198.1 |
| 6,512,313 | B2 | 1/2003 | Choi et al. |
| 6,949,996 | B2 | 9/2005 | Matsumoto et al. |
| 8,670,195 | B2 | 3/2014 | Ikushima et al. |
| 9,300,196 | B2 * | 3/2016 | Han .................... H02K 41/035 |
| 2006/0102386 | A1 | 5/2006 | Morimoto et al. |
| 2009/0096299 | A1 | 4/2009 | Ota et al. |
| 2010/0018048 | A1 | 1/2010 | Sakai et al. |
| 2011/0013895 | A1 | 1/2011 | Chiang |
| 2011/0057129 | A1 | 3/2011 | Yao et al. |
| 2011/0075999 | A1 * | 3/2011 | Chiu .................... G02B 27/646 396/55 |
| 2011/0097062 | A1 | 4/2011 | Tsuruta et al. |
| 2012/0099201 | A1 | 4/2012 | Chan et al. |
| 2012/0160557 | A1 * | 6/2012 | Yamada ............ G02B 26/0858 174/544 |
| 2013/0076924 | A1 | 3/2013 | Wade et al. |
| 2013/0201559 | A1 | 8/2013 | Minamisawa et al. |

FOREIGN PATENT DOCUMENTS

| | | |
|---|---|---|
| JP | 2009-288769 A | 12/2009 |
| JP | 2009-288770 A | 12/2009 |
| JP | 2011133702 A | 7/2011 |
| JP | 2011-257507 A | 12/2011 |
| KR | 10-2010-0088272 A | 8/2010 |
| WO | WO-2011155318 A1 | 12/2011 |

OTHER PUBLICATIONS

Office Action dated May 6, 2015 in U.S. Appl. No. 13/676,628.
Office Action dated Feb. 5, 2018 in Korean Application No. 10-2011-0119351.
Office Action dated Mar. 29, 2018 in Korean Application No. 10-2011-0141199.
Office Action dated Apr. 3, 2018 in Korean Application No. 10-2011-0141200.

* cited by examiner

VOICE COIL MOTOR

CROSS-REFERENCE TO RELATED APPLICATIONS

This application is a continuation of U.S. application Ser. No. 13/676,628, filed Nov. 14, 2012; which claims the benefit under 35 U.S.C. § 119 of Korean Patent Application Nos. 10-2011-0119351, filed Nov. 16, 2011; 10-2011-0141199, filed Dec. 23, 2011; 10-2011-0141200, filed Dec. 23, 2011; and 10-2011-0141201, filed Dec. 23, 2011, which are hereby incorporated by reference in their entirety.

BACKGROUND

Field of the Invention

The present disclosure relates to a VCM (Voice Coil Motor).

Description of Related Art

Recently, a mobile phone mounted with a camera module storing an object as a digital image or a video, a smart phone and a smart pad of a type of a portable personal computer.

A conventional camera module includes a lens and an image sensor module converting light having passed the lens to a digital image. However, the conventional camera module suffers from disadvantages of disablement of auto focus function to adjust a gap between a lens and an image sensor, and lack of function to correct a handshake in handshake-stricken mobile phones, smart phones and smart pads.

Accordingly, there is room for improvement in the camera module.

BRIEF SUMMARY

The present invention is directed to provide a compact VCM (Voice Coil Motor) configured to include an auto focus function and a handshake correction function, to obtain a space for realizing the handshake correction function, to reduce a volume, a height and an area, and to enhance a tilting performance of a rotor.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a VCM, the VCM comprising: a rotor including a bobbin arranged at an upper surface of a base formed with an opening, and a driving coil wound on the bobbin; a stator including a driving magnet opposite to the driving coil, and a yoke secured by the driving magnet at an inner surface of a lateral plate; and a tilting unit including a tilt magnet arranged at an outer surface of the lateral plate, a housing fixing the tilt magnet, and a tilt coil unit opposite to the tilt magnet.

The VCM according to the present disclosure has an advantageous effect in that a signal line of a flexible circuit board for tiling an image sensor along with a rotor is dispersively arranged to inhibit an area of the flexible circuit board from being increased, and the flexible circuit board is inserted into the image sensor arranged on an upper surface of the rigid circuit board to inhibit the VCM from being increased in terms of volume and height.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which.

DETAILED DESCRIPTION

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of a VCM (Voice Coil Motor) according to the present disclosure will be explained in detail together with the figures.

First Exemplary Embodiment

Figure 1:
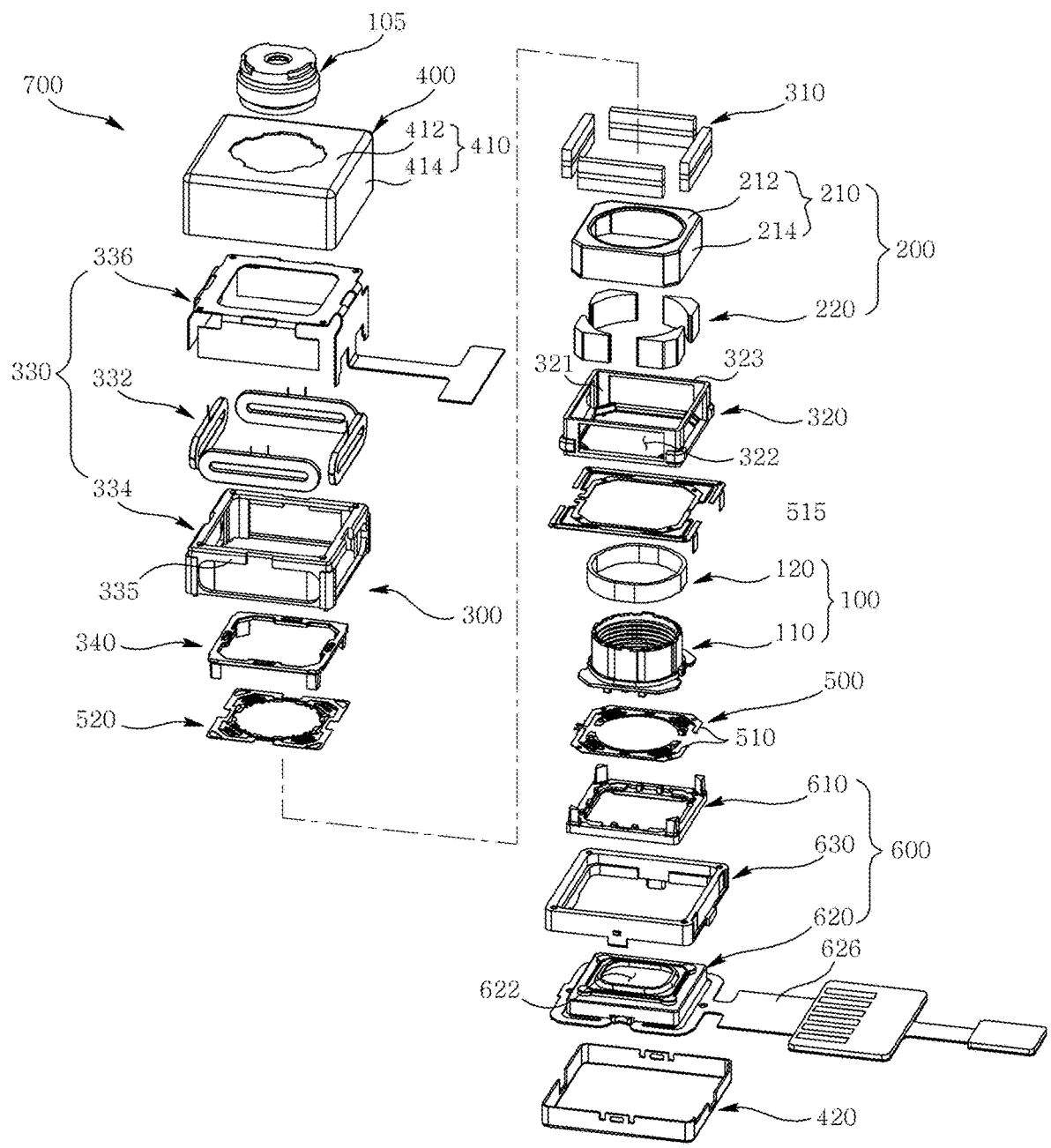
FIG. 1 is an exploded perspective view illustrating a VCM according to a first exemplary embodiment of the present disclosure.
Figure 2:
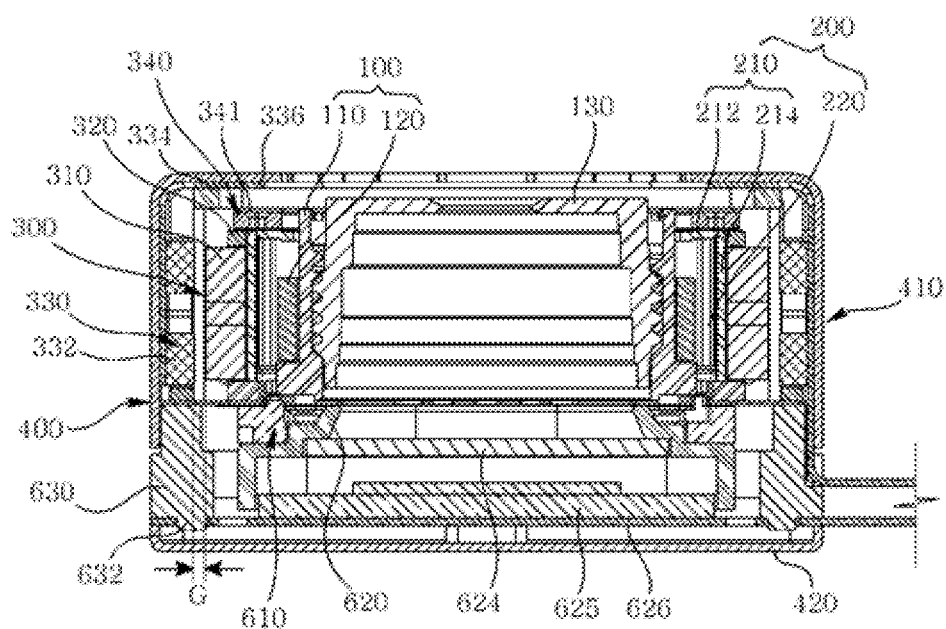
FIG. 2 is an assembled cross-sectional view of FIG. 1.
Figure 3:
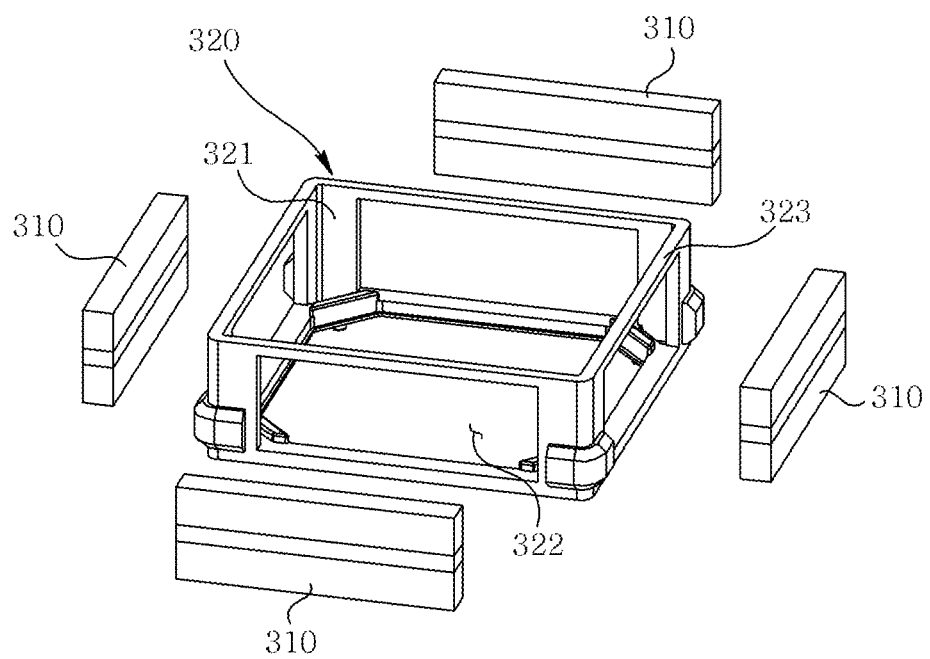
FIG. 3 is an extracted perspective view illustrating a housing and a tilt magnet of FIG. 1.

FIG. 1 is an exploded perspective view illustrating a VCM according to a first exemplary embodiment of the present disclosure, FIG. 2 is an assembled cross-sectional view of FIG. 1, and FIG. 3 is an extracted perspective view illustrating a housing and a tilt magnet of FIG. 1.

Referring to FIGS. 1, 2 and 3, a voice coil motor (hereinafter referred to as VCM, 700) may include a rotor (100), a stator (200), a tilt unit (300) and a cover can (400). In addition, the VCM (700) may further include an elastic member (500) and a base unit (600).

The rotor (100) is mounted with a lens (105), and serves to perform an auto focusing function by vertically moving relative to an upper surface (horizontal plane) of the base unit (600) arranged at a rear side with an image sensor. Furthermore, the rotor (100) performs a handshake correction function by tiling to four (4) directions relative to the upper surface (horizontal plane) of the base unit (600) in response to the tilt unit (300). The rotor (100) includes a bobbin (110) and a driving coil (120). In addition, the rotor (100) may further include a lens barrel (130) and a lens (105).

The bobbin (110) takes a cylindrical shape opened at an upper surface and a bottom surface, and is formed at an inner surface with a female screw thread for securing the lens barrel (130). The lens barrel (130) is coupled by the lens (105). FIG. 2 illustrates the lens barrel (130) not coupled to the lens (105).

The driving coil (120) is formed by winding an insulated long wire in a cylindrical shape, and is arranged at an outer surface of the bobbin (110). The driving coil (120) may be directly wound on the outer surface of the bobbin (110), or may be attached to the outer surface of the bobbin (110) using an adhesive.

Referring to FIG. 1, the bobbin (110) is overlappingly arranged at a bottom surface with first and second driving elastic members (510, 515), both of which comprise an elastic member (500). The first driving elastic member (510) is coupled to the bottom surface of the bobbin (110) in an insulated state, and is electrically connected to each distal end of the driving coil (120). Each of the first driving elastic members (510) is electrically connected to a driving circuit board (626, described later), and a driving signal outputted from the driving circuit board (626) passes the first and second driving elastic members (510, 515) to be applied to the driving coil (120).

The first and second driving elastic members (510, 515) are respectively fixed to a square-shaped base (610) which is one of constituent elements of the base unit (600), and to a case (630, described later). The second driving elastic members (515) is elastically coupled to a bottom surface of a housing (320, described later) to provide elasticity to the housing to return to an original position after the housing (320) is tilted.

The base (610) is fixed at a bottom surface thereof by a holder (620) having an opening (622) opposite to the lens (105) coupled to the bobbin (110), where the holder (620) is arranged at an inner surface with an IR (Infrared) filter (624) covering the opening (622) as shown in FIG. 2. The holder (620) is arranged at an inner surface with an image sensor (625) opposite to the IR filter (624), where the image sensor (625) is mounted at the driving circuit board (626).

The base (610) and the holder (620) are accommodated inside a square-framed case (630), and the driving circuit board (626) is press-fitted into and fixed at a lug (632) protruded from a bottom surface of the case (630). The case (630) is coupled to a bottom cover can (420) by way of a hook coupling method.

The stator (200) includes a yoke (210) and a driving magnet (220). The yoke (210) is arranged opposite to the driving coil (120) of the rotor (100), and includes an upper plate (212) and a lateral plate (214). The upper plate (212) of the yoke (210) takes a shape of a square plate formed with an opening through which light having passed the lens (105) passes, and the lateral plate (214), four (4) in total, is extended from an edge of the upper plate (212).

The driving magnet (220), four (4) in total, for example, is fixed to an inner surface of the lateral plate (214), and arranged opposite to the driving coil (120). The rotor (100) is moved to a direction facing an upper surface of the base (610) by forces generated by a magnetic field from the driving magnet (220) and a magnetic field from the driving coil (120). A gap between the image sensor (625) arranged at a rear surface of the base (610) and the lens (105) can be adjusted by the rotor (100) moving to the direction facing an upper surface of the base (610).

The tilt unit (300) includes a tilt magnet (310), a housing (320), a tilt coil unit (330) and a spacer (340). The tilt magnet (310) is arranged at an outer surface of the lateral plate (214) of the yoke (210). Each of the tilt magnets (310), four (4) in total, is arranged on each of the four (4) lateral plates (214) of the yoke (210). In the exemplary embodiment of the present disclosure, each of the tilt magnets (310) may include a 2-pole magnetizing flat magnet, or a 4-pole magnetizing flat magnet, for example. The tilt magnets (310) is fixed to the lateral plate (214) of the yoke (210) using the housing (320). The housing (320) takes a shape of an upper surface and a bottom surface-opened cylinder, and is coupled to an outer surface of the lateral plates (214) of the yoke (210).

Each of four lateral plates (321) at the housing (320) is formed with an opening (322) for fixing each of the tilt magnets (310), and the tilt magnet (310) is arranged on the yoke (210) using each of the opening (322). The tilt coil unit (330) includes a tilt coil (332), a tile coil housing (334) and a tilt coil driving unit (336).

The tilt coil (332) is formed by winding an insulated coil in a rectangular shape centrally formed with a slip-type opening, and is arranged opposite to the four (4) tilt magnets (310) each coupled to each of the four (4) lateral plates (321) of the housing (320). In the exemplary embodiment of the present disclosure, a gap (G) is formed between a surface of the tilt coil (332) and the tilt magnet (310) for horizontal tilting of the rotor (100).

The tile coil housing (334) functions to fix each of the tilt coils (332) arranged opposite to the four (4) tilt magnets (310). The tile coil housing (334) is opened at an upper surface and a bottom surface, and includes four (4) lateral surfaces (335), and is formed at each lateral surface (335) thereof with an opening for fixing each of the tilt coils (332).

The tilt coil driving unit (336) functions to apply a tilt driving signal to each of the tilt coils (332), may include a flexible circuit board, and is electrically connected to each of the tilt coils (332) while covering each of the tilt coils (332).

Meanwhile, a part of the elastic member (520) is arranged on an upper surface of the housing (320) fixing the tilt magnet (310) and on an upper surface (212) of the yoke (210), and a part of the elastic member (520) is fixed by the bobbin (110). That is, the bobbin (110) is elastically coupled by a pair of elastic members (510) coupled to the bottom surface of the bobbin (110) and the elastic member (520) coupled to the upper surface of the bobbin (110).

The cover can (400) inhibits the rotor (100), the stator (200), the tilt unit (300) and the elastic member (500) from being destructed by outside vibration and shock. The cover can (400) includes an upper cover can (410) and a bottom cover can (420). The upper cover can (410) includes an upper plate (412) and a lateral plate (414). The upper plate (412) of the cover can (400) takes a shape of a square plate having an opening exposing the lens (105), and the lateral plate (414) is extended from the upper plate (412).

In the exemplary embodiment of the present disclosure, the rotor (100) is horizontally tilted by a magnetic field generated from the tilt magnet (310) and a magnetic field from the tilt coil (332) to perform a handshake correction function, and the rotor (100) is vertically moved by the magnetic field from the driving magnet (220) and the magnetic field from the driving coil (120) to perform an auto focusing function.

In order for the rotor (100) to perform the handshake correction function by horizontal tilt and to perform the auto focusing function by vertical movement, a space must be formed between an inner surface of the upper plate (412) of the upper cover can (410) and the rotor (100). However, in a case a large space is formed between an inner surface of the upper plate (412) of the upper cover can (410) and the rotor (100) to perform the handshake correction function or the auto focusing function, it is inevitable that an entire volume and a height of the VCM (700) are greatly increased.

In order to perform the handshake correction function or the auto focusing function without increasing the entire volume and the height of the VCM (700) in the exemplary embodiment of the present disclosure, an upper surface (323) of the housing (320) opposite to the inner surface of the upper plate (412) of the upper cover can (410) of the cover can (400) is placed at a position lower than an upper end of the bobbin (110) of the rotor (100). The upper surface (323) of the housing (320) is arranged at a position lower than the upper end of the bobbin (110). Preferably, the upper surface (323) of the housing (320) may be arranged on a same planar surface as that of the upper surface (212) of the yoke (210).

In a case the upper surface (323) of the housing (320) is placed at a position lower than the upper end of the bobbin (110), or on a same planar surface as that of the upper surface (212) of the yoke (210), the upper surface (323) of the housing (320) coupled to the rotor (100) performing a handshake correction function by being horizontally tilted relative to the horizontal surface or to the rotor (100) vertically moving relative to the horizontal surface is formed with a space not interfered with an inner surface of the upper plate (412) of the upper cover can (410) or the tilt coil driving unit (336).

Furthermore, in a case the upper surface (323) of the housing (320) is placed at a position lower than the upper end of the bobbin (110), or on a same planar surface as that of the upper surface (212) of the yoke (210), the entire volume and the height of the VCM (700) are not increased.

In order to inhibit the upper cover can (410) of the housing (320) from being interfered with the upper surface (212) of the housing (210), a thickness of the lateral plate (321) of the housing (210) is formed less than the thickness of the tilt magnet (310), whereby a part of the upper surface (212) of the housing (210) is exposed from the tilt magnet (310).

Meanwhile, the upper surface (323) of the housing (320) is arranged with the elastic member (520) and the elastic member (520) is fixed by the spacer (340), and in order for the spacer (340) to inhibit the rotor (100) from being interfered with the cover can (410) of the cover can (400) or with the tilt coil driving unit (336), an upper surface (341) of the spacer (340) is arranged at a position lower than the upper end of the bobbin (110), and a lateral surface of the spacer (340) is preferably so formed as not to protrude from an outer surface of the lateral plate (321).

As mentioned in detail in the above description, the VCM according to the present disclosure has an advantageous effect in that a tilt space for performing an auto focusing function adjusting a gap between a lens passed by an outside light and an image sensor generating an image corresponding to the outside light having passed the lens and for performing a handshake correction function without increased volume and thickness of the VCM can be sufficiently provided, whereby generation of an interference among constituent elements due to lack of tilt space can be inhibited during the handshake correction operation and auto focusing operation.

Second Exemplary Embodiment

Figure 4:
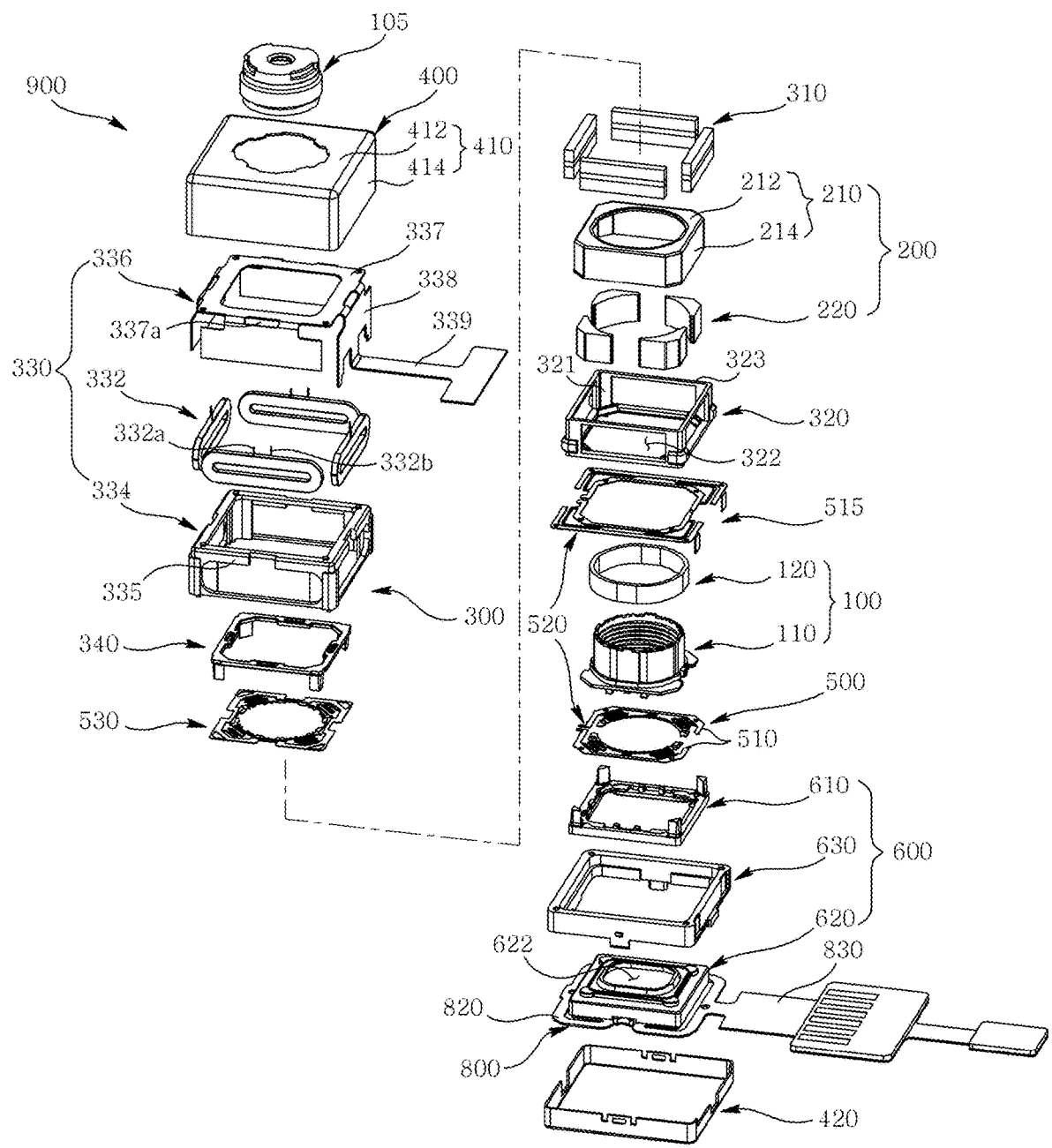
FIG. 4 is an exploded perspective view illustrating a VCM according to a second exemplary embodiment of the present disclosure.
Figure 5:
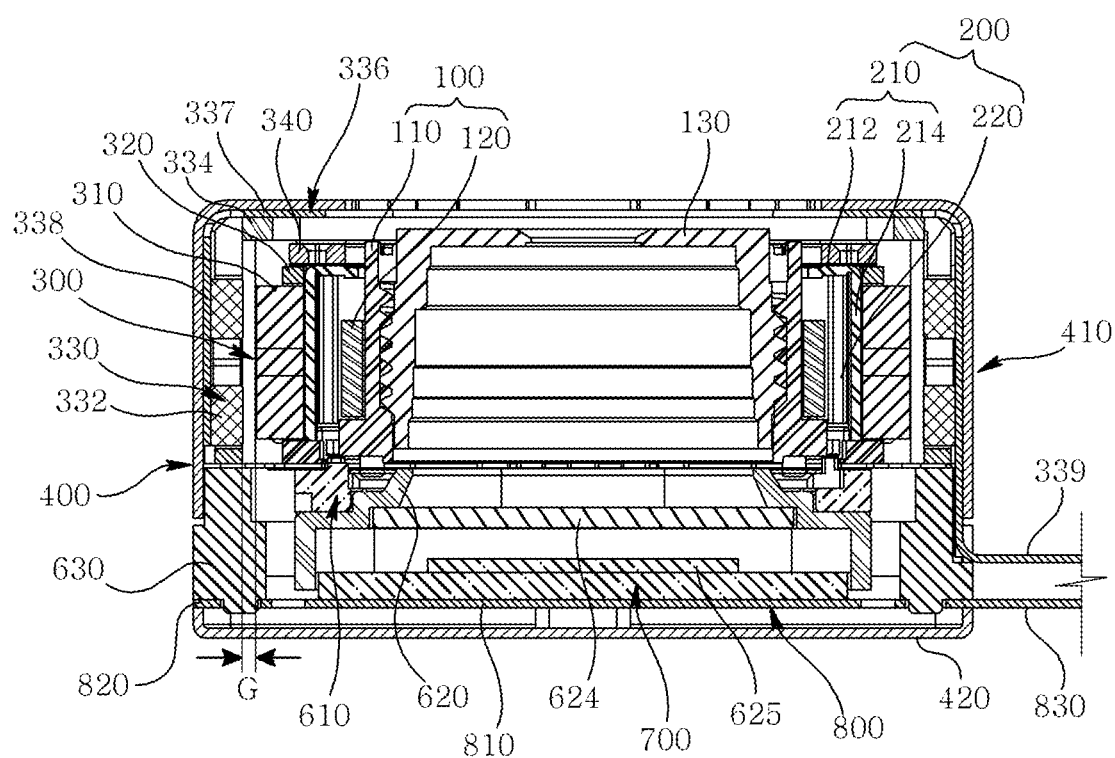
FIG. 5 is an assembled cross-sectional view of FIG. 4.
Figure 6:
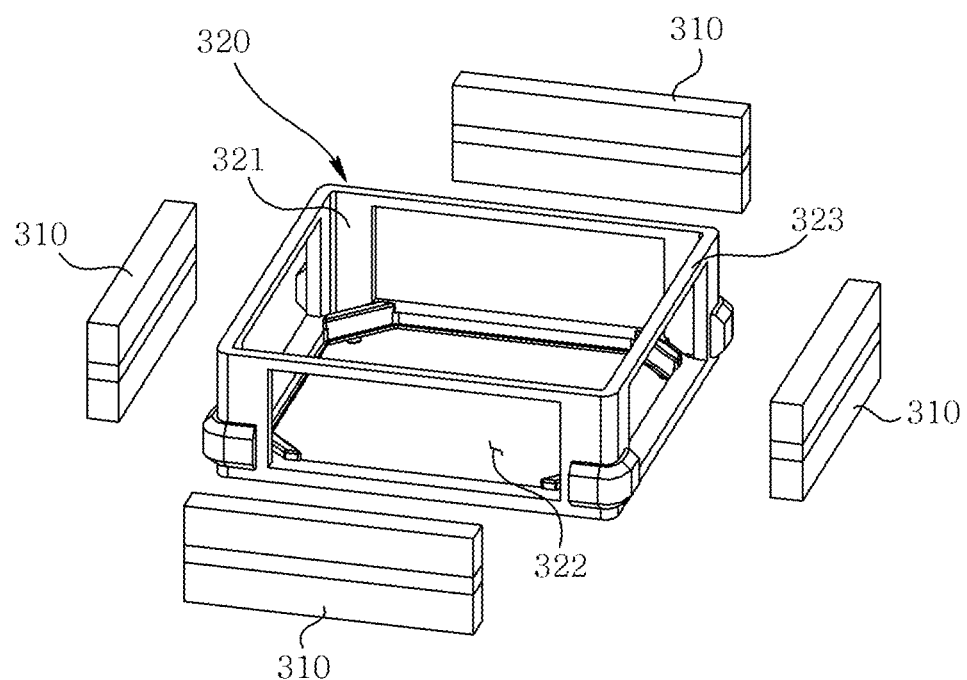
FIG. 6 is an extracted perspective view illustrating a housing and a tilt magnet of FIG. 4.
Figure 7:
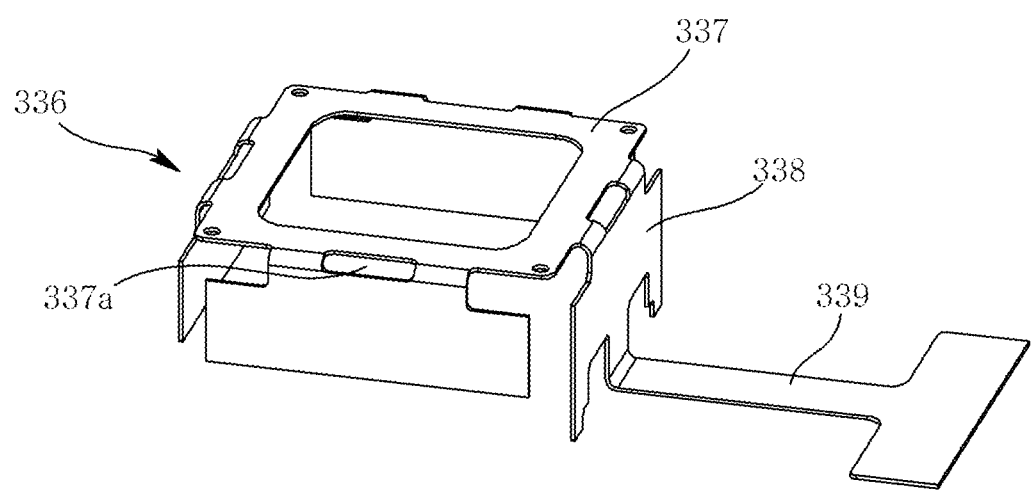
FIG. 7 is an extracted perspective view illustrating a tilt coil driving unit of FIG. 4.

FIG. 4 is an exploded perspective view illustrating a VCM according to a second exemplary embodiment of the present disclosure, FIG. 5 is an assembled cross-sectional view of FIG. 4, FIG. 6 is an extracted perspective view illustrating a housing and a tilt magnet of FIG. 4, and FIG. 7 is an extracted perspective view illustrating a tilt coil driving unit of FIG. 4.

Referring to FIGS. 4 to 7, a voice coil motor (hereinafter referred to as VCM, 700) may include a rotor (100), a stator (200), a tilt unit (300), a rigid circuit board (700) and a flexible circuit board (800). In addition, the VCM (700) may further include a cover can (400), elastic members (500) and a base unit (600).

The rotor (100) is mounted with a lens (105), and serves to perform an auto focusing function by vertically moving relative to an upper surface of the base unit (600) arranged at a rear side with an image sensor. Furthermore, the rotor (100) performs a handshake correction function by horizontally tiling relative to the upper surface (or horizontal plane) of the base unit (600) in response to the tilt unit (300, described later). The rotor (100) includes a bobbin (110) and a driving coil (120). In addition, the rotor (100) may further include a lens barrel (130) and a lens (105).

The bobbin (110) takes a cylindrical shape opened at an upper surface and a bottom surface. The lens barrel (130) is coupled by the lens (105). FIG. 5 illustrates the lens barrel (130) not coupled to the lens (105). The bobbin (110) may be formed by injection molding process in the exemplary embodiment of the present disclosure.

The driving coil (120) is formed by winding an insulated long wire in a cylindrical shape, and is arranged at an outer surface of the bobbin (110). The driving coil (120) may be directly wound on the outer surface of the bobbin (110), or may be attached to the outer surface of the bobbin (110) using an adhesive.

Referring to FIG. 4, the bobbin (110) is arranged at a bottom surface with a first elastic member (520) which is one of the elastic member (500), and the first elastic member (520) is overlappingly arranged with first and second driving elastic members (510, 515).

The first and second driving elastic members (510, 515) are respectively fixed to a square-shaped base (610) which is one of constituent elements of the base unit (600, described later), and to a bottom spacer (630, described later). The second driving elastic members (515) is elastically coupled to a bottom surface of a housing (320, described later) to provide elasticity to the housing to return to an original position after the housing (320) is tilted.

The second driving elastic member (515) is electrically connected to a tilt coil driving unit (336) of a tilt coil unit (330, described later). A driving signal applied to the tilt coil driving unit (336) is applied to the driving coil (120) through the second driving elastic member (515) and the first driving elastic member (510).

The base (610) is fixed at a bottom surface thereof by a holder (620) having an opening (622) opposite to the lens (105) coupled to the bobbin (110), where the holder (620) is arranged at an inner surface with an IR (Infrared) filter (624) covering the opening (622) as shown in FIG. 5. The holder (620) is arranged at an inner surface with an image sensor (625) opposite to the IR filter (624), where the image sensor (625) is mounted at a rigid circuit board (700) and electrically connected to the rigid circuit board (700).

A technical term of 'rigid circuit board (700)' to be frequently used in the present disclosure may be defined as a circuit board that is not flexible and difficult to be bent. The rigid circuit board (700) is shaped of a flat plate formed with a thin thickness, and is formed with a size adequate enough to be fixed into an inner surface of the holder (620).

The rigid circuit board (700) coupled to the holder (620) is tilted along with the base (610) and the holder (620), because the holder (620) is coupled to the base (610), whereby the image sensor (625) electrically connected to the rigid circuit board (700) is also tilted along with the rigid circuit board (700).

A flexible circuit board (800) is brought into contact with a bottom surface of the rigid circuit board (700) and is electrically connected to the rigid circuit board (700) to thereby provide an adequate structure, where a driving signal is provided to the rigid circuit board (700) and the rigid circuit board (700) is tilted along with the holder (620).

The flexible circuit board (800) includes a first board unit (810), a second board unit (820) and a third board unit (830). The first, second and third board units (810, 820, 830) may be integrally formed in the exemplary embodiment of the present disclosure.

The flexible first board unit (810) is formed with a shape and size similar to those of the rigid circuit board (700), and supports the rigid circuit board (700). In a non-limiting example, an upper surface of the first board unit (810) and the rigid circuit board (700) may be attached together using an adhesive.

Meanwhile, a bottom surface of the holder (620) is formed at an edge of the first board unit (810), and the second board unit (820) provides a tilt structure for the first board unit (810) to tilt relative to the second board unit (820). The second board unit (820) is symmetrically formed in a pair relative to the first board unit (810) to allow the first board unit (810) to tilt. The pair of second board units (820) takes a shape of a band, and each distal end of both sides of the second board units (820) is connected to both edges facing the first board unit (810). Each of the pair of second board units (820) wraps three (3) edges adjacent to the first board unit (810), and each of the second board units (820) is symmetrically formed relative to a center of the first board unit (810).

Each of the second board units (820) symmetrically formed relative to the first board unit (810) is formed with a through hole, where each of the through holes is fixed by lugs protruded from the bottom spacer (630). The first board unit (810) is tilted from the second board unit (820) due to fixture of the second board units (820) to the bottom spacer (630).

Each of the pair of second board units (820) is formed with a signal line electrically connected to the rigid circuit board (700), where the signal lines formed on the second board units (820) are extended to the third board units (830, described later) and the signal lines are electrically connected to an outside circuit board through the third board units (830). The third circuit board unit (830) is integrally formed with any one of the second board units (820).

The base (610) and the holder (620) are accommodated inside a square-framed bottom spacer (630), and the through hole of the second board unit (820) of the flexible circuit board (800) is press-fitted by a lug protruded from a bottom end of the bottom spacer (630). The bottom spacer (630) is coupled to a bottom cover can (420) by way of a hook coupling method.

The stator (200) includes a yoke (210) and a driving magnet (220). The yoke (210) is arranged opposite to the driving coil (120) of the rotor (100), and includes an upper plate (212) and a lateral plate (214). The upper plate (212) of the yoke (210) takes a shape of a square plate formed with an opening through which light having passed the lens (105) passes, and the lateral plate (214), four (4) in total, is extended downwards from an edge of the upper plate (212).

The driving magnet (220), four (4) in total, for example, is fixed to an inner surface of the lateral plate (214), and arranged opposite to the driving coil (120).

The rotor (100) is moved to a direction facing an upper surface of the base (610) by forces generated by a magnetic field from the driving magnet (220) and a magnetic field from the driving coil (120). A gap between the image sensor (625) arranged at a rear surface of the base (610) and the lens (105) can be adjusted by the rotor (100) moving to the direction facing an upper surface of the base (610).

The tilt unit (300) includes a tilt magnet (310), a housing (320), a tilt coil unit (330) and a spacer (340). The tilt magnet (310) is arranged at an outer surface of the lateral plate (214) of the yoke (210). Each of the tilt magnets (310), four (4) in total, is arranged on each of the four (4) lateral plates (214) of the yoke (210). In the exemplary embodiment of the present disclosure, each of the tilt magnets (310) may include a 2-pole magnetizing flat magnet, or a 4-pole magnetizing flat magnet, for example.

Although the tilt magnets (310) may be directly arranged on the lateral plate (214) of the yoke (210), the tilt magnet (310) is fixed to the lateral plate (214) of the yoke (210) using the housing (320) in the exemplary embodiment of the present disclosure.

Referring to FIG. 6, the housing (320) takes a shape of an upper surface-opened and a bottom surface-opened cylinder, and is coupled to an outer surface of the lateral plates (214) of the yoke (210).

Each of four lateral plates (321) at the housing (320) is formed with an opening (322) for fixing each of the tilt magnets (310), and the tilt magnet (310) is arranged on an outer surface of the yoke (210) using each of the opening (322).

Referring to FIG. 4, the tilt coil unit (330) includes a tilt coil (332), a tilt coil housing (334) and a tilt coil driving unit (336).

The tilt coil (332) is formed by winding an insulated coil in a rectangular shape to allow a slit-shaped opening to be centrally formed, and is arranged opposite to the four (4) tilt magnets (310) each coupled to each of four (4) lateral plates (321) of the housing (320). Because the tilt coil (332) must be arranged opposite to the four (4) tilt magnets (310), four (4) tilt coils (332) must be formed in the same number as that of the tilt magnets (310). A gap is formed between a surface of the tilt coil (332) and the tilt magnet (310) to allow the rotor (100) to horizontally tilt. Both distal ends (332*a*, 332*b*) of the insulated coil forming the tilt coil (332) are protruded to an upper surface of the tilt coil (332).

In the exemplary embodiment of the present disclosure, the tilt coil (332) and the tilt magnet (310) are arranged to face each other, and an empty space is formed between the tilt coil (332) and the tilt magnet (310) to further enhance the forces generated by magnetic field from the tilt coil (332) and the magnetic field from the tilt magnet (310).

The tilt coil housing (334) serves to fix each of the tilt coils (332) arranged opposite to the four (4) tilt magnets (310). The tilt coil housing (334) is opened at an upper surface and a bottom surface, and includes four (4) lateral surfaces (335), and each of the lateral surfaces (335) of the tilt coil housing (334) are formed with openings for fixing each of the tilt coils (332).

Referring to FIG. 7, the tilt coil driving unit (336) functions to apply a tilt driving signal to each of the tilt coils (332), may include a flexible circuit board, and covers each of the tilt coils (332) to be electrically connected to each of the tilt coils (332). The tilt coil driving unit (336) includes a first tilt coil driving unit (337), a second tilt coil driving unit (338) and a third tilt coil driving unit (339).

The first, second and third tilt coil driving units (337, 338, 339) are integrally formed in the exemplary embodiment of the present disclosure, and each of the first, second and third tilt coil driving units (337, 338, 339) includes a flexible circuit board.

The first tilt coil driving unit (337) is arranged at an upper surface of the tilt coil housing (334), and takes a shape of a square band formed therein with an opening. The second tilt coil driving unit (338) is extended from an outer surface of the first tilt coil driving unit (337) formed in the shape of a square band. Each of the second tilt coil driving units (338) takes a shape of a square plate covering a rear surface of the four (4) tilt coils (332).

In the exemplary embodiment of the present disclosure, the second tilt coil driving units (338) are coupled to a rear surface of the tilt coil (332) opposite to the tilt magnets (310). The second tilt coil driving units (338) and the tilt coil (332) may be mutually attached by using an adhesive, for example.

Because the second tilt coil driving units (338) are coupled to a rear surface of the tilt coil (332) using an adhesive in the exemplary embodiment of the present disclosure, an empty space is formed between the tilt coil (332) and the tilt magnets (310), whereby a tilt performance of the rotor (100) can be further enhanced by the magnetic field generated by the tilt coil (332) and the tilt magnet (310).

A part of the second tilt coil driving units (338) is electrically connected to a part of the driving coil (120) electrically connected to the first elastic member (520).

Meanwhile, connection openings (337*a*) are formed between the first and second tilt coil driving units (337, 338), where the connection openings (337*a*) are formed at a position corresponding to that of the both distal ends (332*a*, 332*b*) of the tilt coil (332). The both distal ends (332*a*, 332*b*) of the tilt coil (332) are inserted into the connection openings (337*a*), and may be electrically connected to a terminal formed at the first tilt coil driving unit (337) using a welding or a conductive adhesive tape. Furthermore, the terminal formed at the first tilt coil driving unit (337) and the both distal ends (332*a*, 332*b*) of the tilt coil (332) can be easily assembled by electrical connection from outside.

The third tilt coil driving unit (339) is extended from any one of the four (4) second tilt coil driving units (338), electrically connected to an outside circuit board, and a tilt driving signal applied from the outside circuit board is applied to the tilt coil (332) through the third tilt coil driving unit (339), the second tilt coil driving unit (338) and the first tilt coil driving unit (337).

The third tilt coil driving unit (339) in the exemplary embodiment of the present disclosure is formed in parallel with the third board unit (830) of the circuit board (800). Meanwhile, a part of the second elastic member (530) which is one of the elastic member (500) is arranged on the upper surface of the housing (320) fixing the tilt magnet (310) and on the upper surface of the yoke (210), and a part of the second elastic member (530) is fixed by the bobbin (110). That is, the bobbin (110) is elastically coupled by the first elastic member (520) coupled to the bottom end of the bobbin (110) and the second elastic member (530) coupled to the upper surface of the bobbin (110).

The cover can (400) inhibits the rotor (100), the stator (200), the tilt unit (300) and the elastic member (500) from being destructed by outside vibration and shock. The cover can (400) includes an upper cover can (410) and a bottom cover can (420). The upper cover can (410) includes an upper plate (412) and a lateral plate (414). The upper plate (412) of the cover can (400) takes a shape of a square plate having an opening exposing the lens (105), and the lateral plate (414) is extended from the upper plate (412).

In the exemplary embodiment of the present disclosure, the rotor (100) is horizontally tilted by a magnetic field generated from the tilt magnet (310) and a magnetic field from the tilt coil (332) to perform a handshake correction function, and the rotor (100) is vertically moved by the magnetic field from the driving magnet (220) and the magnetic field from the driving coil (120) to perform an auto focusing function.

In order for the rotor (100) to perform the handshake correction function by horizontal tilt and to perform the auto focusing function by vertical movement, a space must be formed between an inner surface of the upper plate (412) of the upper cover can (410) and the rotor (100). However, in a case a large space is formed between the inner surface of the upper plate (412) of the upper cover can (410) and the rotor (100) to perform the handshake correction function or the auto focusing function, it is inevitable that an entire volume and a height of the VCM (900) are greatly increased.

In order to perform the handshake correction function or the auto focusing function without increasing the entire volume and the height of the VCM (700) in the exemplary embodiment of the present disclosure, an upper surface (323) of the housing (320) opposite to the inner surface of the upper plate (412) of the upper cover can (410) of the cover can (400) is placed at a position lower than an upper end of the bobbin (110) of the rotor (100). The upper surface (323) of the housing (320) is arranged at a position lower than the upper end of the bobbin (110). Preferably, the upper surface (323) of the housing (320) may be arranged on a same planar surface as that of the upper surface (212) of the yoke (210).

In a case the upper surface (323) of the housing (320) is placed at a position lower than the upper end of the bobbin (110), or on a same planar surface as that of the upper surface (212) of the yoke (210), the upper surface (323) of the housing (320) coupled to the rotor (100) performing a handshake correction function by being horizontally tilted relative to the horizontal surface or to the rotor (100) vertically moving relative to the horizontal surface is formed with a space not interfered with an inner surface of the upper plate (412) of the upper cover can (410) or the tilt coil driving unit (336).

Furthermore, in a case the upper surface (323) of the housing (320) is placed at a position lower than the upper end of the bobbin (110), or on a same planar surface as that of the upper surface (212) of the yoke (210), the entire volume and the height of the VCM (900) are not increased.

In order to inhibit the upper cover can (410) of the housing (320) from being interfered with the upper surface (212) of the housing (210), a thickness of the lateral plate (321) of the housing (210) is formed less than the thickness of the tilt magnet (310), whereby a part of the upper surface (212) of the housing (210) is exposed from the tilt magnet (310).

Meanwhile, the upper surface (323) of the housing (320) is arranged with the second elastic member (530), and the second elastic member (530) is fixed by the spacer (340), and in order for the spacer (340) to inhibit the rotor (100) from being interfered with the cover can (410) of the cover can (400) or with the tilt coil driving unit (336), an upper surface (341) of the spacer (340) is arranged at a position lower than the upper end of the bobbin (110), and a lateral surface of the spacer (340) is preferably so formed as not to protrude from an outer surface of the lateral plate (321) of the housing (210).

As mentioned in detail in the above description, the VCM according to the present disclosure has an advantageous effect in that a fixing structure and an electrical structure tilting a rotor are enhanced to improve an attractive force and a repulsive force acting between a tilt coil and a tilt magnet, whereby a tilt performance can be further improved.

Third Exemplary Embodiment

Figure 8:
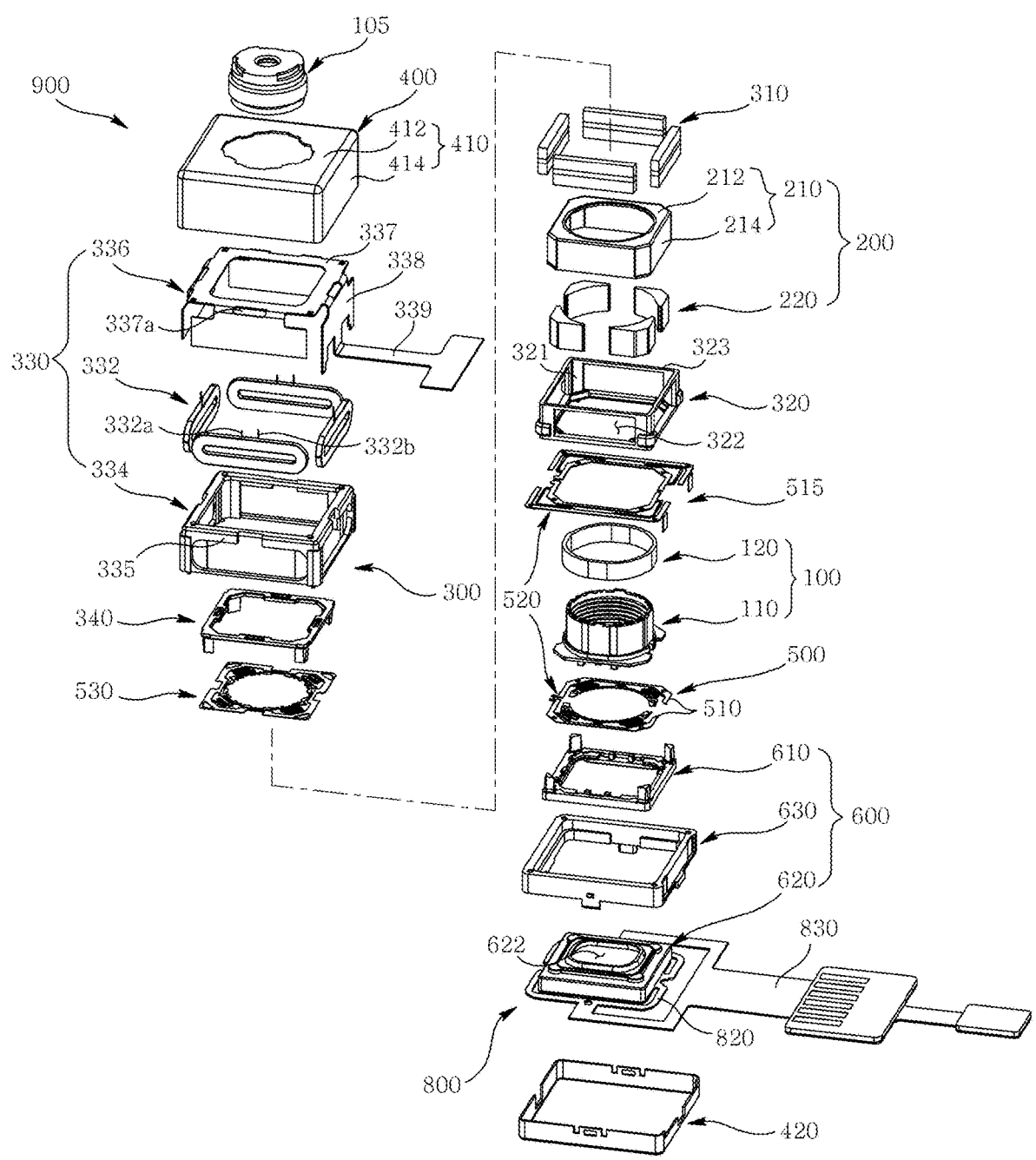
FIG. 8 is an exploded perspective view illustrating a VCM according to a third exemplary embodiment of the present disclosure.
Figure 9:
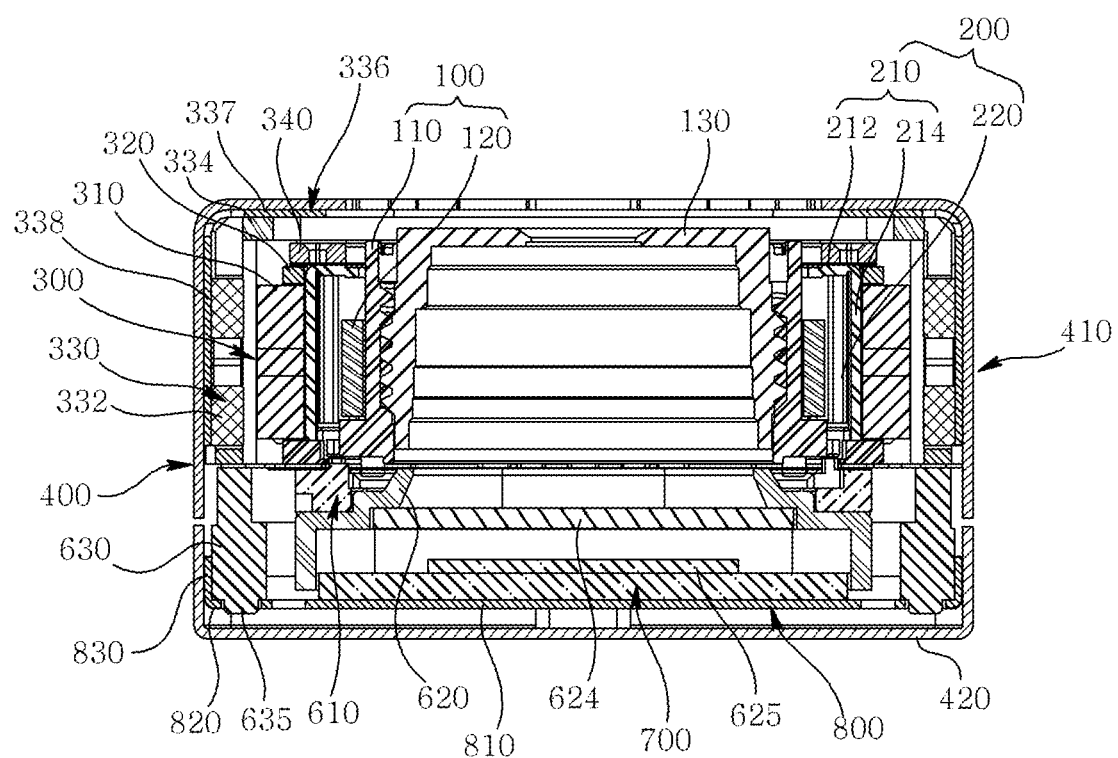
FIG. 9 is an assembled cross-sectional view of FIG. 8.
Figure 10:
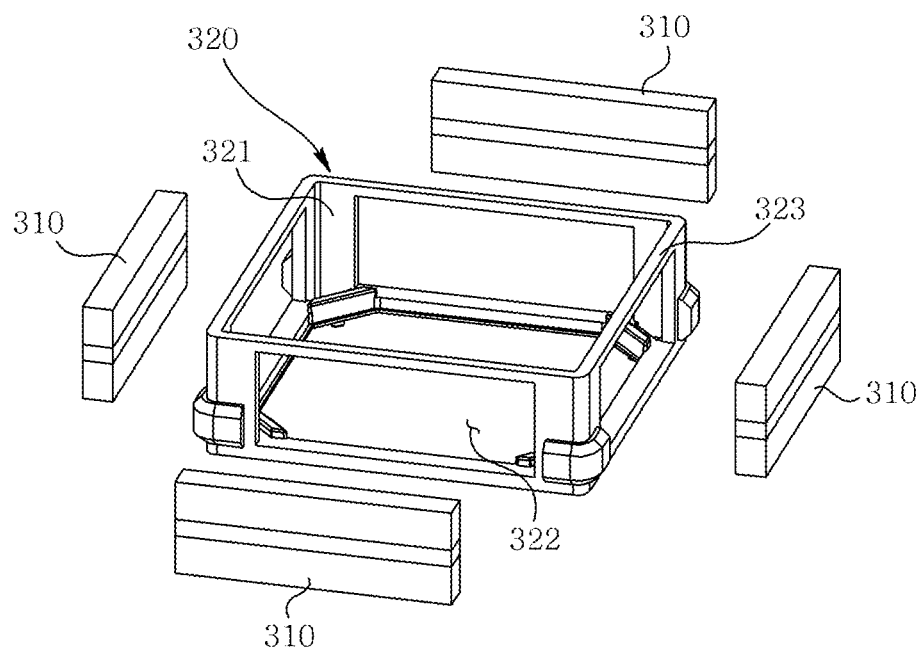
FIG. 10 is an extracted perspective view illustrating a housing and a tilt magnet of FIG. 8.
Figure 11:
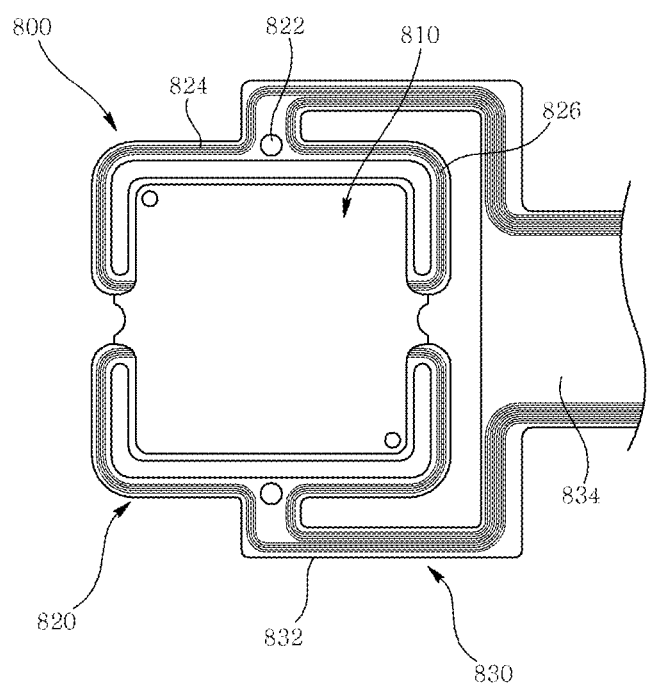
FIG. 11 is a perspective view illustrating a flexible circuit board mounted with a rigid circuit board of FIG. 8.
Figure 12:
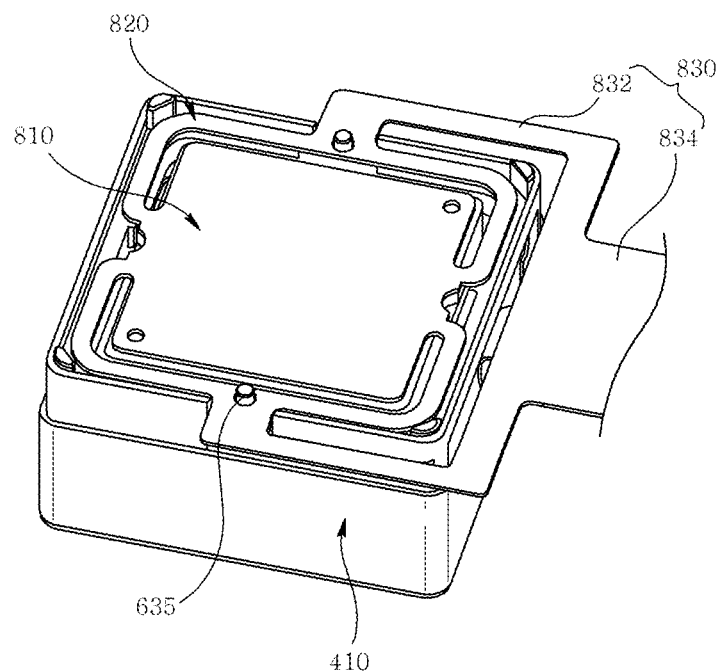
FIG. 12 is a perspective view illustrating a state of a second board unit of a flexible circuit board that is not bent.
Figure 13:
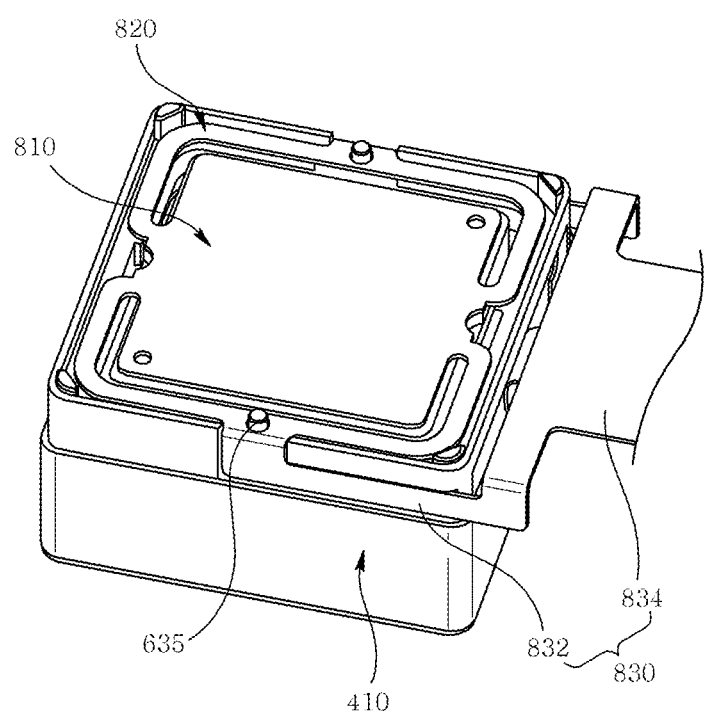
FIG. 13 is a perspective view illustrating a state of a second board unit of a flexible circuit board of FIG. 12 that is bent.

FIG. 8 is an exploded perspective view illustrating a VCM according to a third exemplary embodiment of the present disclosure, FIG. 9 is an assembled cross-sectional view of FIG. 8, FIG. 10 is an extracted perspective view illustrating a housing and a tilt magnet of FIG. 8, FIG. 11 is a perspective view illustrating a flexible circuit board mounted with a rigid circuit board of FIG. 8, FIG. 12 is a perspective view illustrating a state of a second board unit of a flexible circuit board that is not bent, and FIG. 13 is a perspective view illustrating a state of a second board unit of a flexible circuit board of FIG. 12 that is bent.

Referring to FIGS. 8 to 13, a voice coil motor (hereinafter referred to as VCM, 900) may include a rotor (100), a stator (200), a tilt unit (300), a rigid circuit board (700) and a flexible circuit board (800). In addition, the VCM (900) may further include a cover can (400), elastic members (500) and a base unit (600).

The rotor (100) is mounted with a lens (105), and serves to perform an auto focusing function by vertically moving relative to an upper surface of the base unit (600) arranged at a rear side with an image sensor. Furthermore, the rotor (100) performs a handshake correction function by horizontally tiling relative to the upper surface (or horizontal plane) of the base unit (600) in response to the tilt unit (300, described later). The rotor (100) includes a bobbin (110) and a driving coil (120). In addition, the rotor (100) may further include a lens barrel (130) and a lens (105).

The bobbin (110) takes a cylindrical shape opened at an upper surface and a bottom surface. The bobbin (110) is formed at an inner surface with a female screw thread for fixing the lens barrel (130). The lens barrel (130) is coupled by the lens (105). FIG. 9 illustrates the lens barrel (130) not coupled to the lens (105). The bobbin (110) may be formed by injection molding process in the exemplary embodiment of the present disclosure.

The driving coil (120) is formed by winding an insulated long wire in a cylindrical shape, and is arranged at an outer surface of the bobbin (110). The driving coil (120) may be directly wound on the outer surface of the bobbin (110), or may be attached to the outer surface of the bobbin (110) using an adhesive.

Referring to FIG. 8, the bobbin (110) is arranged at a bottom surface with a first elastic member (520) which is one of the elastic member (500), and the first elastic member (520) is overlappingly arranged with first and second driving elastic members (510, 515).

The first driving elastic member (510) is coupled to the bottom surface of the bobbin (110) in an insulated state, and electrically connected to each of both distal ends of the driving coil (120).

The first and second driving elastic members (510, 515) are respectively fixed to a square-shaped base (610) which is one of constituent elements of the base unit (600, described later), and to a bottom spacer (630, described later). The second driving elastic members (515) is elastically coupled to a bottom surface of a housing (320, described later) to provide elasticity to the housing to return to an original position after the housing (320) is tilted.

Each of the second driving elastic members (515) is electrically connected to a tilt coil driving unit (336) of a tilt coil unit (330, described later). A driving signal applied to the tilt coil driving unit (336) is applied to the driving coil (120) through the second driving elastic members (515).

The base (610) is fixed at a bottom surface thereof by a holder (620) having an opening (622) opposite to the lens (105) coupled to the bobbin (110), where the holder (620) is arranged at an inner surface with an IR (Infrared) filter (624) covering the opening (622) as shown in FIG. 9. The holder (620) is arranged at an inner surface with an image sensor (625) opposite to the IR filter (624), where the image sensor (625) is mounted at a rigid circuit board (700) and electrically connected to the rigid circuit board (700).

A technical term of 'rigid circuit board (700)' to be frequently used in the present disclosure may be defined as a circuit board that is not flexible and difficult to be bent. The rigid circuit board (700) is shaped of a flat plate formed with a thin thickness, and is formed with a size adequate enough to be fixed into an inner surface of the holder (620).

The rigid circuit board (700) coupled to the holder (620) is tilted along with the base (610) and the holder (620), because the holder (620) is coupled to the base (610), whereby the image sensor (625) electrically connected to the rigid circuit board (700) is also tilted along with the rigid circuit board (700).

A flexible circuit board (800) is brought into contact with a bottom surface of the rigid circuit board (700) and is electrically connected to the rigid circuit board (700) to thereby provide an adequate structure, where a driving signal is provided to the rigid circuit board (700) and the rigid circuit board (700) is tilted along with the holder (620).

The flexible circuit board (800) includes a first board unit (810), a second board unit (820) and a third board unit (830). The first, second and third board units (810, 820, 830) may be integrally formed in the exemplary embodiment of the present disclosure.

The flexible first board unit (810) is formed with a shape and size similar to those of the rigid circuit board (700), and supports the rigid circuit board (700). In a non-limiting example, an upper surface of the first board unit (810) and the rigid circuit board (700) may be attached together using an adhesive. Meanwhile, the bottom surface of the holder (620) is coated with an adhesive, and attached to the first board unit (810).

The second board unit (820) is formed at an edge of the first board unit (810), and provides a structure to allow the first board unit (810) to tilt relative to the second board unit (820).

The second board unit (820) is symmetrically formed in a pair relative to the first board unit (810) to allow the first board unit (810) to tilt. The pair of second board units (820) takes a shape of a band, for example, and each distal end of both sides of the second board units (820) is connected to both edges facing the first board unit (810). Each of the pair of second board units (820) wraps three (3) edges adjacent to the first board unit (810), and each of the second board units (820) is symmetrically formed relative to a center of the first board unit (810).

Each of the second board units (820) symmetrically formed relative to the first board unit (810) is formed with a through hole (822), where each of the through holes (822) is fixed by lugs (635) protruded from the bottom spacer (630). The first board unit (810) is tilted from the second board unit (820) due to fixture of the second board units (820) to the bottom spacer (630).

Each of the pair of second board units (820) is formed with signal lines (824, 826) electrically connected to the rigid circuit board (700), where the signal lines (824, 826) formed on the second board units (820) are extended to the third board units (830, described later) and the signal lines (824, 826) are electrically connected to an outside circuit board through the third board units (830). The third circuit board unit (830) includes first connection board units (832) and second connection board units (834).

The first connection board units (832) are integrally formed with a pair of second board units (820) and are protruded to an outside of the first board unit (810). The second connection board units are integrally formed with a pair of first connection board units (832) and are electrically connected to an outside circuit board.

The signal lines (824, 826) formed on each of the second board units (820) are electrically connected to the outside circuit board through the first connection board unit (832) and the second connection board unit (834).

In the exemplary embodiment of the present disclosure, each width of the second board unit (820) can be reduced, because the signal lines (824, 826) are dispersively arranged on the pair of second board units (820), whereby an area of the VCM (900) can be made in a more compact size.

Meanwhile, in a case the signal lines (824, 826) are dispersively arranged on the pair of second board units (820) in order to reduce the width of the second board unit (820), the first connection board unit (832) may rather further increase the area of the VCM (900), because the first connection board unit (832) is protruded to the outside from the second board units (820).

Thus, the first connection board unit (832) of the third board unit (830) is bent to be fixed to a lateral surface of the VCM (900) in the exemplary embodiment of the present disclosure, whereby the area of the VCM (900) is inhibited from increasing by the third board unit (830).

The base (610) and the holder (620) are accommodated inside a square-framed bottom spacer (630), and the through hole of the second board unit (820) of the flexible circuit board (800) is press-fitted by a lug (635) protruded from a bottom end of the bottom spacer (630). The bottom spacer (630) is coupled to a bottom cover can (420) by way of a hook coupling method.

The stator (200) includes a yoke (210) and a driving magnet (220). The yoke (210) is arranged opposite to the driving coil (120) of the rotor (100), and includes an upper plate (212) and a lateral plate (214). The upper plate (212) of the yoke (210) takes a shape of a square plate formed with an opening through which light having passed the lens (105) passes, and the lateral plate (214), four (4) in total, is extended downwards from an edge of the upper plate (212).

The driving magnet (220), four (4) in total, for example, is fixed to an inner surface of the lateral plate (214), and arranged opposite to the driving coil (120).

The rotor (100) is moved to a direction facing an upper surface of the base (610) by forces generated by a magnetic field from the driving magnet (220) and a magnetic field from the driving coil (120). A gap between the image sensor (625) arranged at a rear surface of the base (610) and the lens (105) can be adjusted by the rotor (100) moving to the direction facing an upper surface of the base (610).

The tilt unit (300) includes a tilt magnet (310), a housing (320), a tilt coil unit (330) and a spacer (340). The tilt magnet (310) is arranged at an outer surface of the lateral plate (214) of the yoke (210). Each of the tilt magnets (310), four (4) in total, is arranged on each of the four (4) lateral plates (214) of the yoke (210). In the exemplary embodiment of the present disclosure, each of the tilt magnets (310) may include a 2-pole magnetizing flat magnet, or a 4-pole magnetizing flat magnet, for example.

Although the tilt magnets (310) may be directly arranged on the lateral plate (214) of the yoke (210), the tilt magnet (310) is fixed to the lateral plate (214) of the yoke (210) using the housing (320) in the exemplary embodiment of the present disclosure.

The housing (320) is formed in a cylindrical shape opened at an upper surface and a bottom surface, and is also formed in a shape of being coupled to an outer surface of the lateral plate (214) of the yoke (210). Four lateral plates (321) of the housing (320) are formed with openings (322) for fixing each of the tilt magnets (310), where the tilt magnet (310) is arranged on the yoke (210) using each of the openings (322).

Referring to FIG. 8, the tilt coil unit (330) includes a tilt coil (332), a tilt coil housing (334) and a tilt coil driving unit (336).

The tilt coil (332) is formed by winding an insulated coil in a rectangular shape to allow a slit-shaped opening to be centrally formed, and is arranged opposite to the four (4) tilt magnets (310) each coupled to each of four (4) lateral plates (321) of the housing (320).

Because the tilt coil (332) must be arranged opposite to the four (4) tilt magnets (310), four (4) tilt coils (332) must be formed in the same number as that of the tilt magnets (310). A gap is formed between a surface of the tilt coil (332) and the tilt magnet (310) to allow the rotor (100) to horizontally tilt. Both distal ends (332*a*, 332*b*) of the insulated coil forming the tilt coil (332) are protruded to an upper surface of the tilt coil (332).

In the exemplary embodiment of the present disclosure, the tilt coil (332) and the tilt magnet (310) are arranged to face each other, and an empty space is formed between the tilt coil (332) and the tilt magnet (310) to further enhance the forces generated by magnetic field from the tilt coil (332) and the magnetic field from the tilt magnet (310).

The tilt coil housing (334) serves to fix each of the tilt coils (332) arranged opposite to the four (4) tilt magnets (310). The tilt coil housing (334) is opened at an upper surface and a bottom surface, and includes four (4) lateral surfaces (335), and each of the lateral surfaces (335) of the tilt coil housing (334) are formed with openings for fixing each of the tilt coils (332).

The tilt coil driving unit (336) functions to apply a tilt driving signal to each of the tilt coils (332), may include a flexible circuit board, and covers each of the tilt coils (332) to be electrically connected to each of the tilt coils (332). The tilt coil driving unit (336) includes a first tilt coil driving unit (337), a second tilt coil driving unit (338) and a third tilt coil driving unit (339).

The first, second and third tilt coil driving units (337, 338, 339) are integrally formed in the exemplary embodiment of the present disclosure, and each of the first, second and third tilt coil driving units (337, 338, 339) includes a flexible circuit board.

The first tilt coil driving unit (337) is arranged at an upper surface of the tilt coil housing (334), and takes a shape of a square band formed therein with an opening. The second tilt coil driving unit (338) is extended from an outer surface of the first tilt coil driving unit (337) formed in the shape of a square band. Each of the second tilt coil driving units (338) takes a shape of a square plate covering a rear surface of the four (4) tilt coils (332).

In the exemplary embodiment of the present disclosure, the second tilt coil driving units (338) are coupled to a rear surface of the tilt coil (332) opposite to the tilt magnets (310). The second tilt coil driving units (338) and the tilt coil (332) may be mutually attached by using an adhesive, for example.

Because the second tilt coil driving units (338) are coupled to a rear surface of the tilt coil (332) using an adhesive in the exemplary embodiment of the present disclosure, an empty space is formed between the tilt coil (332) and the tilt magnets (310), whereby a tilt performance of the rotor (100) can be further enhanced by the magnetic field generated by the tilt coil (332) and the tilt magnet (310).

A part of the second tilt coil driving units (338) is electrically connected to a part of the driving coil (120) electrically connected to the first elastic member (520).

Meanwhile, connection openings (337*a*) are formed between the first and second tilt coil driving units (337, 338), where the connection openings (337*a*) are formed at a position corresponding to that of both distal ends (332*a*, 332*b*) of the tilt coil (332). The both distal ends (332*a*, 332*b*) of the tilt coil (332) are inserted into the connection openings (337*a*), and may be electrically connected to a terminal formed at the first tilt coil driving unit (337) using a welding or a conductive adhesive tape. Furthermore, the terminal formed at the first tilt coil driving unit (337) and the both distal ends (332*a*, 332*b*) of the tilt coil (332) can be easily assembled by electrical connection from outside.

The third tilt coil driving unit (339) is extended from any one of the four (4) second tilt coil driving units (338), and electrically connected to an outside circuit board, and a tilt driving signal applied from the outside circuit board is applied to each of the tilt coils (332) through the third tilt coil driving unit (339), the second tilt coil driving unit (338) and the first tilt coil driving unit (337).

The third tilt coil driving unit (339) in the exemplary embodiment of the present disclosure is formed in parallel with the third board unit (830) of the circuit board (800).

Meanwhile, a part of the second elastic member (530) which is one of the elastic member (500) is arranged on the upper surface of the housing (320) fixing the tilt magnet (310) and on the upper surface (212) of the yoke (210), and a part of the second elastic member (530) is fixed by the bobbin (110). That is, the bobbin (110) is elastically coupled by the first elastic member (520) coupled to the bottom end of the bobbin (110) and the second elastic member (530) coupled to the upper surface of the bobbin (110).

The cover can (400) inhibits the rotor (100), the stator (200), the tilt unit (300) and the elastic member (500) from being destructed by outside vibration and shock. The cover can (400) includes an upper cover can (410) and a bottom cover can (420). The upper cover can (410) includes an upper plate (412) and a lateral plate (414). The upper plate (412) of the cover can (400) takes a shape of a square plate having an opening exposing the lens (105), and the lateral plate (414) is extended from the upper plate (412).

In the exemplary embodiment of the present disclosure, the rotor (100) is horizontally tilted by a magnetic field generated from the tilt magnet (310) and a magnetic field from the tilt coil (332) to perform a handshake correction function, and the rotor (100) is vertically moved by the magnetic field from the driving magnet (220) and the magnetic field from the driving coil (120) to perform an auto focusing function.

Meanwhile, in order for the rotor (100) to perform the handshake correction function by horizontal tilt and to perform the auto focusing function by vertical movement, a space must be formed between an inner surface of the upper plate (412) of the upper cover can (410) and the rotor (100). However, in a case a large space is formed between the inner surface of the upper plate (412) of the upper cover can (410) and the rotor (100) to perform the handshake correction function or the auto focusing function, it is inevitable that an entire volume and a height of the VCM (900) are greatly increased.

In order to realize a tilt space for performing the handshake correction function or the auto focusing function without increasing the entire volume and the height of the VCM (700) in the exemplary embodiment of the present disclosure, an upper surface (323) of the housing (320) opposite to the inner surface of the upper plate (412) of the upper cover can (410) of the cover can (400) is placed at a position lower than an upper end of the bobbin (110) of the rotor (100). The upper surface (323) of the housing (320) is arranged at a position lower than the upper end of the bobbin (110). Preferably, the upper surface (323) of the housing (320) may be arranged on a same planar surface as that of the upper surface (212) of the yoke (210).

In a case the upper surface (323) of the housing (320) is placed at a position lower than the upper end of the bobbin (110), or on a same planar surface as that of the upper surface (212) of the yoke (210), a space is formed where the upper surface (323) of the housing (320) coupled to the rotor (100) performing a handshake correction function by being horizontally tilted relative to the horizontal surface or to the rotor (100) vertically moving relative to the horizontal surface is not interfered with an inner surface of the upper plate (412) of the upper cover can (410) or the tilt coil driving unit (336).

Furthermore, in a case the upper surface (323) of the housing (320) is placed at a position lower than the upper end of the bobbin (110), or on a same planar surface as that of the upper surface (212) of the yoke (210), the entire volume and the height of the VCM (900) are not increased.

In order to inhibit the upper cover can (410) of the housing (320) from being interfered with the upper surface (212) of the housing (210), a thickness of the lateral plate (321) of the housing (210) is formed less than the thickness of the tilt magnet (310), whereby a part of the upper surface (212) of the housing (210) is exposed from the tilt magnet (310).

Meanwhile, the upper surface (323) of the housing (320) is arranged with the second elastic member (530), and the second elastic member (530) is fixed by the spacer (340), and in order for the spacer (340) to inhibit the rotor (100) from being interfered with the cover can (410) of the cover can (400) or with the tilt coil driving unit (336), an upper surface (341) of the spacer (340) is arranged at a position lower than the upper end of the bobbin (110), and a lateral surface of the spacer (340) is preferably so formed as not to protrude from an outer surface of the lateral plate (321) of the housing (210).

As mentioned in detail in the above description, the VCM according to the present disclosure has an advantageous effect in that the VCM is electrically connected to a rigid circuit board mounted with an image sensor, and signal lines of a flexible circuit board capable of tilting the rigid circuit board is dispersively arranged to reduce an area of the flexible circuit board and to reduce an entire volume of the VCM.

Fourth Exemplary Embodiment

Figure 14:
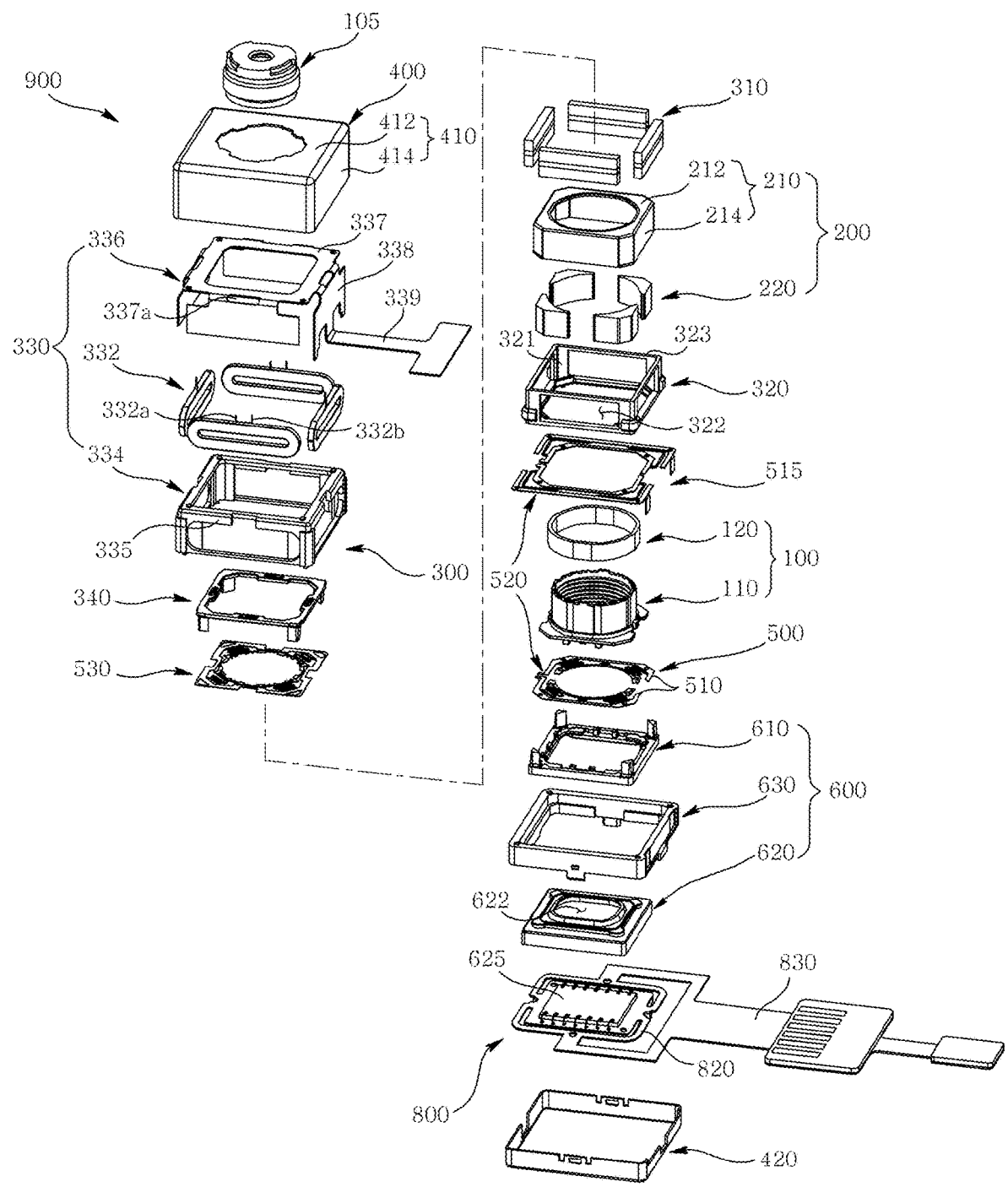
FIG. 14 is an exploded perspective view illustrating a VCM according to a fourth exemplary embodiment of the present disclosure.
Figure 15:
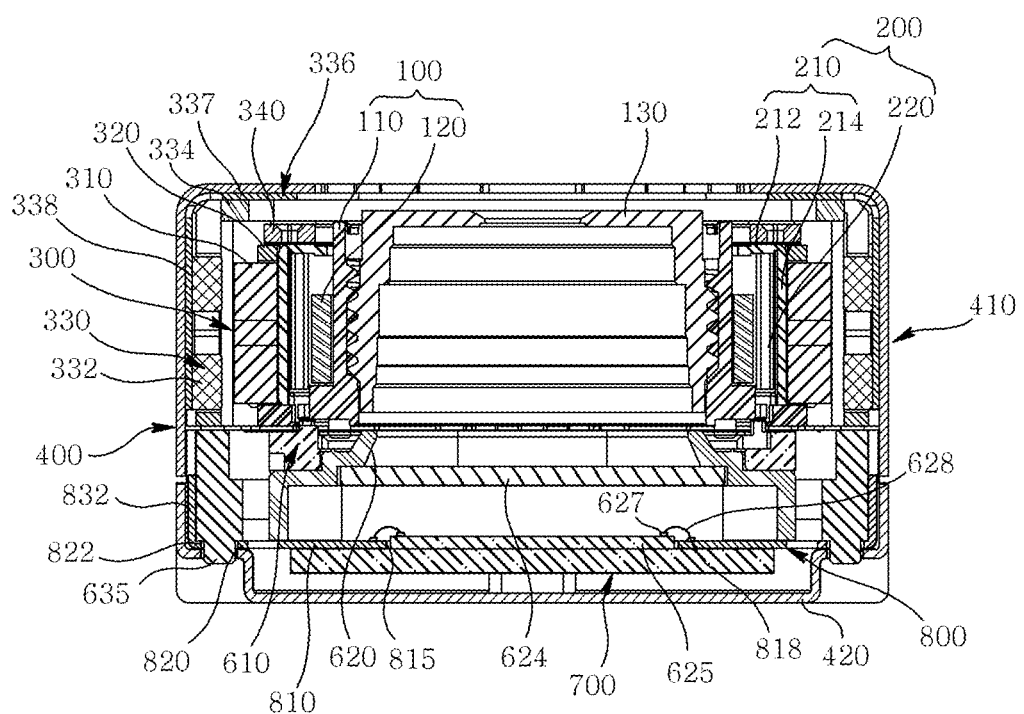
FIG. 15 is an assembled cross-sectional view of FIG. 14.
Figure 16:
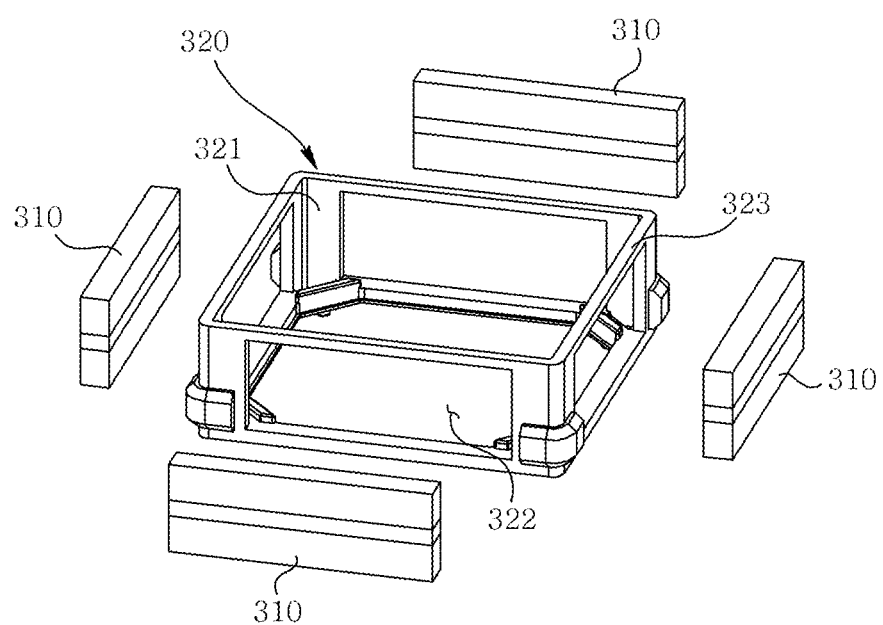
FIG. 16 is an extracted perspective view illustrating a housing and a tilt magnet of FIG. 14.
Figure 17:
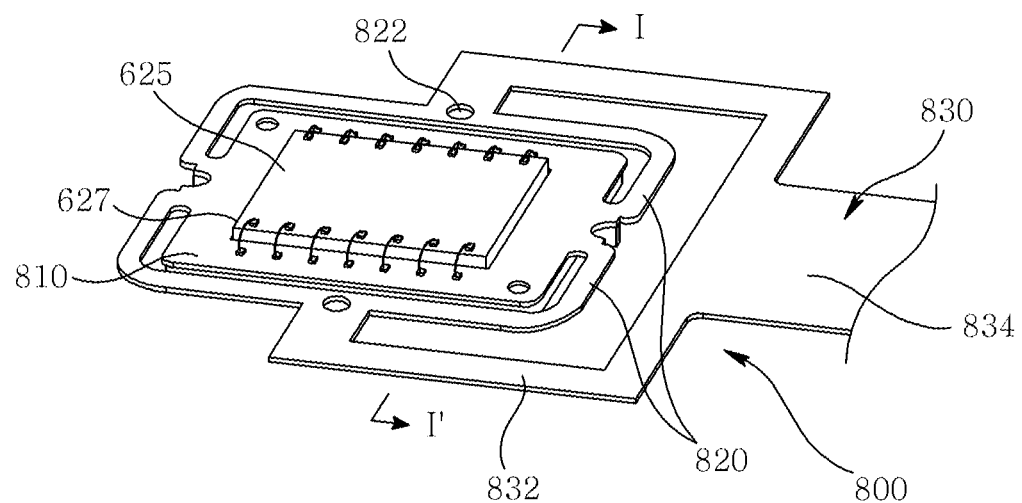
FIG. 17 is a perspective view illustrating a flexible circuit board of FIG. 15.
Figure 18:
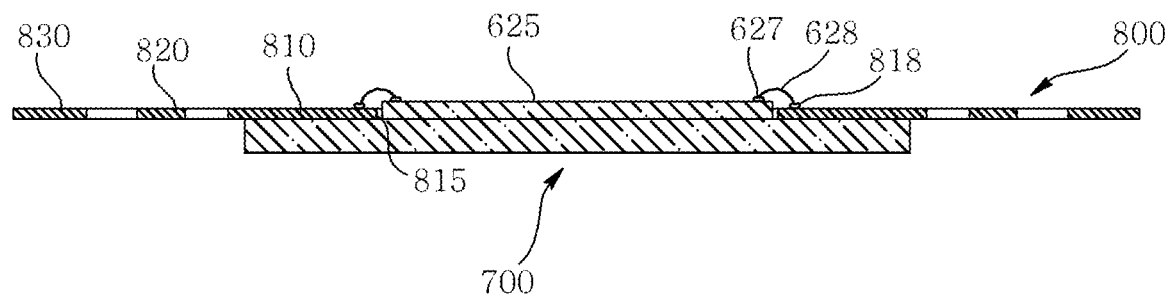
FIG. 18 is a cross-sectional view taken along line I-I' of FIG. 17.

FIG. 14 is an exploded perspective view illustrating a VCM according to a fourth exemplary embodiment of the present disclosure, FIG. 15 is an assembled cross-sectional view of FIG. 14, FIG. 16 is an extracted perspective view illustrating a housing and a tilt magnet of FIG. 14, FIG. 17 is a perspective view illustrating a flexible circuit board of FIG. 15, and FIG. 18 is a cross-sectional view taken along line I-I' of FIG. 17.

Referring to FIGS. 14 to 18, a voice coil motor (hereinafter referred to as VCM, 900) may include a rotor (100), a stator (200), a tilt unit (300), a rigid circuit board (700) and a flexible circuit board (800). In addition, the VCM (900) may further include a cover can (400), elastic members (500) and a base unit (600).

The rotor (100) is mounted with a lens (105), and serves to perform an auto focusing function by vertically moving relative to an upper surface of the base unit (600) arranged at a rear side with an image sensor. Furthermore, the rotor (100) performs a handshake correction function by horizontally tiling relative to the upper surface (or horizontal plane) of the base unit (600) in response to the tilt unit (300, described later). The rotor (100) includes a bobbin (110) and a driving coil (120). In addition, the rotor (100) may further include a lens barrel (130) and a lens (105).

The bobbin (110) takes a cylindrical shape opened at an upper surface and a bottom surface. The lens barrel (130) is coupled by the lens (105). FIG. 2 illustrates the lens barrel (130) not coupled to the lens (105). The bobbin (110) may be formed by injection molding process in the exemplary embodiment of the present disclosure.

The driving coil (120) is formed by winding an insulated long wire in a cylindrical shape, and is arranged at an outer surface of the bobbin (110). The driving coil (120) may be directly wound on the outer surface of the bobbin (110), or may be attached to the outer surface of the bobbin (110) using an adhesive.

Referring to FIG. 14, the bobbin (110) is arranged at a bottom surface with a first elastic member (520) which is one of the elastic member (500), and the first elastic member (520) is overlappingly arranged with first and second driving elastic members (510, 515).

The first driving elastic member (510) is coupled to the bottom surface of the bobbin (110) in an insulated state, and electrically connected to each of both distal ends of the driving coil (120).

The first and second driving elastic members (510, 515) are respectively fixed to a square-shaped base (610), which is one of constituent elements of the base unit (600, described later), and to a bottom spacer (630, described later). The second driving elastic members (515) is elastically coupled to a bottom surface of a housing (320, described later) to provide elasticity to the housing to return to an original position after the housing (320) is tilted.

Each of the second driving elastic members (515) is electrically connected to a flexible circuit board (800, described later). A driving signal applied to the flexible circuit board (800) is applied to the driving coil (120) through the first and second driving elastic members (510, 515).

The base (610) is fixed at a bottom surface thereof by a holder (620) having an opening (622) opposite to the lens (105) coupled to the bobbin (110), where the holder (620) is arranged at an inner surface with an IR (Infrared) filter (624) covering the opening (622) as shown in FIG. 2.

Referring to FIGS. 14, 17 and 18, the holder (620) is arranged at an inner surface with an image sensor (625) opposite to the IR filter (624), where the image sensor (625) is mounted at a rigid circuit board (700, described later) and electrically connected to the rigid circuit board (700).

A technical term of 'rigid circuit board (700)' to be frequently used in the present disclosure may be defined as a circuit board that is not flexible and difficult to be bent.

A flexible circuit board (800) in the exemplary embodiment of the present disclosure is arranged on an upper surface of the rigid circuit board (700).

The flexible circuit board (800) is brought into contact with an upper surface of the rigid circuit board (700) and is electrically connected to the rigid circuit board (700) to thereby provide an adequate structure, where a driving signal is provided to the rigid circuit board (700) and the rigid circuit board (700) is tilted along with the holder (620).

The flexible circuit board (800) includes a first board unit (810), a second board unit (820) and a third board unit (830). The first, second and third board units (810, 820, 830) may be integrally formed in the exemplary embodiment of the present disclosure.

The flexible circuit board (800) includes an opening (815) exposing the image sensor (625), and a portion where the image sensor (625) of the first board unit (810) is exposed and the rigid circuit board (700) is covered is attached to the rigid circuit board (700) using an adhesive.

The image sensor (625) cannot be directly and electrically coupled to the rigid circuit board (700) because an upper surface of the rigid circuit board (700) is covered by the first board unit (810) of the flexible circuit board (800). Thus, an upper surface of the image sensor (625) is arranged with first terminals (627), and an upper surface of the first board unit (810) is arranged with second terminals (818) corresponding to the first terminals (627), where the first and second terminals (627, 818) are wire-bonded by a conductive wire (628).

In a case the opening (815) is formed on the first board unit (810) of the flexible circuit board (800), and the image sensor (625) is inserted into the opening (815) through an opening of the first board unit (810), the image sensor (625) and the flexible circuit board (800) are overlapped to reduce the volume and height of the VCM (900) as much as the thickness of the flexible circuit board (800), and a spatial utilization of a rear surface of the flexible circuit board (800) can be greatly enhanced to further reduce the volume and height of the VCM (900).

Meanwhile, a bottom surface of the holder (620) is coated with an adhesive to allow the holder (620) to be attached to the first board unit (810) of the flexible circuit board (800), and the first board unit (810) is arranged on an upper surface of the rigid circuit board (700), whereby a bottom shape of the holder (620) can be simplified and an adhered area between the holder (620) and the first board unit (810) can be improved as well.

The second board unit (820) is formed at an edge of the first board unit (810), and provides a tilt structure to allow the first board unit (810) to tilt relative to the second board unit (820).

The second board unit (820) is symmetrically formed in a pair relative to the first board unit (810) to allow the first board unit (810) to tilt. The pair of second board units (820) takes a shape of a band, for example, and each distal end of both sides of the second board units (820) is connected to both edges facing the first board unit (810). Each of the pair of second board units (820) wraps three (3) edges adjacent to the first board unit (810), and each of the second board units (820) is symmetrically formed relative to a center of the first board unit (810).

Each of the second board units (820) symmetrically formed relative to the first board unit (810) is formed with a through hole (822), where each of the through holes (822) is fixed by lugs (635) protruded from the bottom spacer (630) illustrated in FIG. 2. The first board unit (810) is tilted from the second board unit (820) due to fixture of the second board units (820) to the bottom spacer (630).

Each of the pair of second board units (820) is formed with signal lines (824, 826) electrically connected to the rigid circuit board (700), where the signal lines (824, 826) formed each of on the second board units (820) are extended to the third board units (830, described later) and the signal lines (824, 826) are electrically connected to an outside circuit board through the third board units (830). The third circuit board unit (830) includes first connection board units (832) and second connection board units (834).

The first connection board units (832) are integrally formed with a pair of second board units (820) and are protruded to an outside of the first board unit (810). The second connection board units are integrally formed with a pair of first connection board units (832) and are electrically connected to an outside circuit board.

The signal lines (824, 826) formed on each of the second board units (820) are electrically connected to the outside circuit board through the first connection board unit (832) and the second connection board unit (834).

In the exemplary embodiment of the present disclosure, each width of the second board unit (820) can be reduced, because the signal lines (824, 826) are dispersively arranged on the pair of second board units (820), whereby an area of the VCM (900) can be made in a more compact size.

Meanwhile, in a case the signal lines (824, 826) are dispersively arranged on the pair of second board units (820) in order to reduce the width of the second board unit (820), the first connection board unit (832) may rather further increase the area of the VCM (900), because the first connection board unit (832) is protruded to the outside from the second board units (820).

Thus, the first connection board unit (832) of the third board unit (830) is bent to be fixed to a lateral surface of the VCM (900) in the exemplary embodiment of the present disclosure, whereby the area of the VCM (900) is inhibited from increasing by the third board unit (830).

The base (610) and the holder (620) are accommodated inside a square-framed bottom spacer (630), and the through hole of the second board unit (820) of the flexible circuit board (800) is press-fitted by a lug (632) protruded from a bottom end of the bottom spacer (630). The bottom spacer (630) is coupled to a bottom cover can (420) by way of a hook coupling method.

The stator (200) includes a yoke (210) and a driving magnet (220). The yoke (210) is arranged opposite to the driving coil (120) of the rotor (100), and includes an upper plate (212) and a lateral plate (214). The upper plate (212) of the yoke (210) takes a shape of a square plate formed with an opening through which light having passed the lens (105) passes, and the lateral plate (214), four (4) in total, is extended downwards from an edge of the upper plate (212).

The driving magnet (220), four (4) in total, for example, is fixed to an inner surface of the lateral plate (214), and arranged opposite to the driving coil (120).

The rotor (100) is moved to a direction facing an upper surface of the base (610) by forces generated by a magnetic field from the driving magnet (220) and a magnetic field from the driving coil (120). A gap between the image sensor (625) arranged at a rear surface of the base (610) and the lens (105) can be adjusted by the rotor (100) moving to the direction facing an upper surface of the base (610).

The tilt unit (300) includes a tilt magnet (310), a housing (320), a tilt coil unit (330) and a spacer (340). The tilt magnet (310) is arranged at an outer surface of the lateral plate (214) of the yoke (210). Each of the tilt magnets (310), four (4) in total, is arranged on each of the four (4) lateral plates (214) of the yoke (210). In the exemplary embodiment of the present disclosure, each of the tilt magnets (310) may include a 2-pole magnetizing flat magnet, or a 4-pole magnetizing flat magnet, for example.

Referring to FIGS. 14 and 16, it may be acceptable to allow the tilt magnets (310) to be directly arranged on the lateral plate (214) of the yoke (210), the tilt magnet (310) is fixed to the lateral plate (214) of the yoke (210) using the housing (320) in the exemplary embodiment of the present disclosure.

The housing (320) is formed in a cylindrical shape opened at an upper surface and a bottom surface, and is also formed in a shape of being coupled to an outer surface of the lateral plate (214) of the yoke (210). Four lateral plates (321) of the housing (320) are formed with openings (322) for fixing each of the tilt magnets (310), where the tilt magnet (310) is arranged on the yoke (210) using each of the openings (322).

The tilt coil unit (330) includes a tilt coil (332), a tilt coil housing (334) and a tilt coil driving unit (336).

The tilt coil (332) is formed by winding an insulated coil in a rectangular shape to allow a slit-shaped opening to be centrally formed, and is arranged opposite to the four (4) tilt magnets (310) each coupled to each of four (4) lateral plates (321) of the housing (320).

A gap is formed between a surface of the tilt coil (332) and the tilt magnet (310) to allow the rotor (100) to horizontally tilt.

The tilt coil housing (334) serves to fix each of the tilt coils (332) arranged opposite to the four (4) tilt magnets (310). The tilt coil housing (334) is opened at an upper surface and a bottom surface, and includes four (4) lateral surfaces (335), and each of the lateral surfaces (335) of the tilt coil housing (334) are formed with openings for fixing each of the tilt coils (332).

The tilt coil driving unit (336) functions to apply a tilt driving signal to each of the tilt coils (332), may include a flexible circuit board, and covers each of the tilt coils (332) to be electrically connected to each of the tilt coils (332). The tilt coil driving unit (336) includes a first tilt coil driving unit (337), a second tilt coil driving unit (338) and a third tilt coil driving unit (339). An opening (337a) is formed between the first and second tilt coil driving units (337, 338).

Meanwhile, a part of the second elastic member (530) which is one of the elastic member (500) is arranged on the upper surface of the housing (320) fixing the tilt magnet (310) and on the upper surface (212) of the yoke (210), and a part of the second elastic member (530) is fixed by the bobbin (110). That is, the bobbin (110) is elastically coupled by the first elastic member (520) coupled to the bottom end of the bobbin (110) and the second elastic member (530) coupled to the upper surface of the bobbin (110).

The cover can (400) inhibits the rotor (100), the stator (200), the tilt unit (300) and the elastic member (500) from being destructed by outside vibration and shock. The cover can (400) includes an upper cover can (410) and a bottom cover can (420). The upper cover can (410) includes an upper plate (412) and a lateral plate (414). The upper plate (412) of the cover can (400) takes a shape of a square plate having an opening exposing the lens (105), and the lateral plate (414) is extended from the upper plate (412).

In the exemplary embodiment of the present disclosure, the rotor (100) is horizontally tilted by a magnetic field generated from the tilt magnet (310) and a magnetic field from the tilt coil (332) to perform a handshake correction function, and the rotor (100) is vertically moved by the magnetic field from the driving magnet (220) and the magnetic field from the driving coil (120) to perform an auto focusing function.

Meanwhile, in order for the rotor (100) to perform the handshake correction function by horizontal tilt and to perform the auto focusing function by vertical movement, a space must be formed between an inner surface of the upper plate (412) of the upper cover can (410) and the rotor (100). However, in a case a large space is formed between the inner surface of the upper plate (412) of the upper cover can (410) and the rotor (100) to perform the handshake correction function or the auto focusing function, it is inevitable that an entire volume and a height of the VCM (900) are greatly increased.

In order to realize a tilt space for performing the handshake correction function or the auto focusing function without increasing the entire volume and the height of the VCM (700) in the exemplary embodiment of the present disclosure, an upper surface (323) of the housing (320) opposite to the inner surface of the upper plate (412) of the upper cover can (410) of the cover can (400) is placed at a position lower than an upper end of the bobbin (110) of the rotor (100). The upper surface (323) of the housing (320) is arranged at a position lower than the upper end of the bobbin (110). Preferably, the upper surface (323) of the housing (320) may be arranged on a same planar surface as that of the upper surface (212) of the yoke (210).

In a case the upper surface (323) of the housing (320) is placed at a position lower than the upper end of the bobbin (110), or on a same planar surface as that of the upper surface (212) of the yoke (210), a space is formed where the upper surface (323) of the housing (320) coupled to the rotor (100) performing a handshake correction function by being horizontally tilted relative to the horizontal surface or to the rotor (100) vertically moving relative to the horizontal surface is not interfered with an inner surface of the upper plate (412) of the upper cover can (410) or the tilt coil driving unit (336).

Furthermore, in a case the upper surface (323) of the housing (320) is placed at a position lower than the upper end of the bobbin (110), or on a same planar surface as that of the upper surface (212) of the yoke (210), the entire volume and the height of the VCM (900) are not increased.

In order to inhibit the upper cover can (410) of the housing (320) from being interfered with the upper surface (212) of the housing (210), a thickness of the lateral plate (321) of the housing (210) is formed less than the thickness of the tilt magnet (310), whereby a part of the upper surface (212) of the housing (210) is exposed from the tilt magnet (310).

Meanwhile, the upper surface (323) of the housing (320) is arranged with the second elastic member (530), and the second elastic member (530) is fixed by the spacer (340), and in order for the spacer (340) to inhibit the rotor (100) from being interfered with the cover can (410) of the cover can (400) or with the tilt coil driving unit (336), an upper surface (341) of the spacer (340) is arranged at a position lower than the upper end of the bobbin (110), and a lateral surface of the spacer (340) is preferably so formed as not to protrude from an outer surface of the lateral plate (321) of the housing (210).

As mentioned in detail in the above description, the VCM according to the present disclosure has an advantageous effect in that signal lines of a flexible circuit board for tilting an image sensor along with a rotor are dispersively arranged to reduce an area of the flexible circuit board, and the flexible circuit board is inserted into the image sensor arranged on an upper surface of a rigid circuit board to reduce an entire volume of the VCM.

The above-mentioned VCM according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A Voice Coil Motor (VCM), the VCM comprising:
a mover including a bobbin disposed on an upper surface of a base formed with an opening, and a driving coil wound on the bobbin;
a stator including a first magnet facing the driving coil, and a yoke secured by the first magnet;
an elastic member coupled to the mover and the stator;
a first circuit board connected to the stator and disposed lower than the stator; and
a case discretely spaced apart from the stator;

wherein the first circuit board includes a first board unit, a plurality of second board units symmetrically formed in a pair with respect to the first board unit, and a third board unit connected to each of the pair of second board units, respectively;

wherein each distal end of any side of the second board units extends from opposite edges of the first board unit, and wherein the first circuit board is secured to the case at two or more locations.

2. The VCM of claim 1, comprising a tilt unit including a second magnet fixed in a housing and a tilt coil unit configured to generate a magnetic field for tilting of the mover.

3. The VCM of claim 1 wherein the first board unit is tilted with respect to at least one second board unit.

4. The VCM of claim 3, wherein the third board unit is integrally formed with the pair of second board units, respectively.

5. The VCM of claim 2, wherein a thickness of the housing is formed smaller than that of each magnet of a plurality of tilt magnets to expose a part of an upper surface of the corresponding magnet of the plurality of tilt magnets for obtainment of a tilt space of the mover.

6. The VCM of claim 2, wherein the tilt coil unit includes a tilt coil driving unit electrically connected to the tilt coil unit.

7. The VCM of claim 6, wherein the tilt coil driving unit includes a first tilt coil driving unit disposed on an upper surface of the housing, second tilt coil driving units respectively extending from an edge of the first tilt coil driving unit, and a third tilt coil driving unit extended from any one of the second tilt coil driving units.

8. The VCM of claim 7, wherein the first, second, and third tilt coil driving units are integrally formed.

9. The VCM of claim 8, wherein each distal end at a side of the tilt coil unit or the first tilt coil driving unit is electrically connected by welding or a conductive adhesive tape.

10. The VCM of claim 8, wherein an adhesive is interposed between the second tilt coil driving units and a rear surface of the tilt coil unit.

11. The VCM of claim 8, wherein the second tilt coil driving units are electrically connected to the driving coil and electrically connected to the elastic member elastically supporting the mover, and the third tilt coil driving unit is electrically connected to an external circuit board.

12. The VCM of claim 6, wherein the tilt coil driving unit includes a flexible circuit board.

13. The VCM of claim 1, comprising a rigid circuit board electrically connected to an image sensor, and a flexible circuit board electrically connected to the rigid circuit board for tilting the rigid circuit board.

14. The VCM of claim 13, wherein each of the second board units includes a signal line electrically connected to the rigid circuit board.

15. The VCM of claim 2, comprising a bottom spacer for supporting the tilt coil unit, wherein the bottom spacer is formed at a bottom surface thereof with a lug applying pressure to and fixing the second board units, and wherein each of the second board units is formed with a through hole insertable by the lug.

16. A camera module having the voice coil motor of claim 2, the camera having:
    a lens; and
    an image sensor, wherein the voice coil motor adjusts a distance between the lens and the image sensor.

17. The camera module of claim 16, comprising a spacer disposed between the housing and a bottom surface of a cover can.

18. The camera module of claim 17, wherein a gap is foilted between the tilt coil unit and each magnet of a plurality of tilt magnets for tilting the bobbin.

19. The camera module of claim 18, wherein the camera module is embedded in a mobile phone.

20. A mobile phone having the camera module of claim 18, wherein the lens is coupled to the bobbin and the bobbin is supported by the elastic member, such that the camera module is configured to perform an auto focus function and a handshake correction function.

21. A Voice Coil Motor (VCM), the VCM comprising:
    a mover including a bobbin disposed on an upper surface of a base formed with an opening, and a driving coil wound on the bobbin;
    a stator including a first magnet facing the driving coil, and a yoke secured by the first magnet;
    an elastic member coupled to the mover and the stator;
    a first circuit board connected to the stator and disposed lower than the stator; and
    a case discretely spaced apart from the stator;
    wherein the first circuit board includes a first board unit disposed on an upper surface of a rigid circuit board and having an opening for exposing an image sensor, a pair of symmetrically formed second board units formed at opposite edges of the first board unit, and a third board unit connected to each of the pair of second board units, respectively; and
    wherein the first circuit board is secured to the case at two or more locations.

22. The VCM of claim 21, wherein the image sensor is formed at an upper surface of the image sensor with first terminals, the first board unit is formed at an upper surface of the first board unit with second terminals corresponding to the first terminals, and the first and second terminals are wire-bonded by a conductive wire.

23. The VCM of claim 21, wherein each of the second board units takes a shape of a band to wrap three (3) lateral surfaces adjacent to the first board unit, and each distal end of both sides of the second board units is connected to each lateral surface of both sides opposite to the first board unit.

* * * * *